United States Patent
Zwegers et al.

(10) Patent No.: US 12,446,670 B2
(45) Date of Patent: Oct. 21, 2025

(54) WHEELED LUGGAGE ITEM WITH INTEGRATED PERSONAL MOBILITY CAPABILITY

(71) Applicant: Toyota Motor Engineering & Manufacturing North America, Inc., Plano, TX (US)

(72) Inventors: Corey Zwegers, Dexter, MI (US); Adam R. VanAntwerp, Chelsea, MI (US); Brian Schneidewind, Ann Arbor, MI (US); Bradley Steven Baskin, Saline, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 391 days.

(21) Appl. No.: 18/073,950

(22) Filed: Dec. 2, 2022

(65) Prior Publication Data
US 2024/0180308 A1   Jun. 6, 2024

(51) Int. Cl.
*A63C 5/03*   (2006.01)
*A45C 5/03*   (2006.01)
(Continued)

(52) U.S. Cl.
CPC .............. *A45C 13/262* (2013.01); *A45C 5/03* (2013.01); *A45C 5/14* (2013.01); *B62K 15/00* (2013.01); *A45C 2009/005* (2013.01)

(58) Field of Classification Search
CPC ........... A45C 13/262; A45C 5/03; A45C 5/14; A45C 2009/005; B62K 15/00
(Continued)

(56) References Cited

U.S. PATENT DOCUMENTS 3,314,494 A  4/1967 Weitzner
4,913,252 A  4/1990 Bartley et al.
(Continued)

FOREIGN PATENT DOCUMENTS

AU   2013248199 A1   5/2015
CN   106627967 A    5/2017
(Continued)

OTHER PUBLICATIONS

Translation of CN 109572899A accessed at ip.com on Feb. 22, 2025. (Year: 2019).*

(Continued)

*Primary Examiner* — James A Shriver, II
*Assistant Examiner* — Hilary L Johns
(74) *Attorney, Agent, or Firm* — Christopher G. Darrow; Darrow Mustafa PC

(57) ABSTRACT

A wheeled luggage item includes a base defining an interior cavity, and a liner structured to partition the interior cavity into a first portion and a second portion physically isolated from the first portion. Personal luggage items may be stored in the cavity first portion. First and second wheels are rotatably coupled to the base so as to be movable between stowed positions in the cavity second portion and deployed positions outside the base, to enable a riding mode of the luggage item. Steering levers are rotatably deployable to operably connect to the first wheel, enabling the first wheel to be steered by a user riding the luggage item in the riding mode. To propel the luggage item in the riding mode, a battery in the interior cavity may power an in-wheel motor operably connected to the second wheel.

20 Claims, 17 Drawing Sheets

(51) Int. Cl.
*A45C 5/14* (2006.01)
*A45C 13/26* (2006.01)
*B62K 15/00* (2006.01)
*A45C 9/00* (2006.01)

(58) Field of Classification Search
USPC .......................................................... 280/30
See application file for complete search history.

(56) References Cited

U.S. PATENT DOCUMENTS

| | | | |
|---|---|---|---|
| 5,794,744 A * | 8/1998 | Lin | A45C 5/14 190/127 |
| 5,879,022 A * | 3/1999 | Winton | A63B 55/00 280/DIG. 6 |
| 6,607,207 B2 * | 8/2003 | Shapiro | B62K 9/00 280/287 |
| 6,845,991 B1 * | 1/2005 | Ritucci | B62B 3/007 280/30 |
| 7,118,115 B2 * | 10/2006 | Abel | B62B 3/001 280/38 |
| 7,249,779 B2 | 7/2007 | Ehrenreich et al. | |
| 7,971,803 B1 | 7/2011 | Barlowe | |
| 8,282,113 B2 | 10/2012 | Veal et al. | |
| 9,033,350 B2 | 5/2015 | Porri | |
| 9,265,675 B2 | 2/2016 | Ransenberg et al. | |
| 9,440,698 B2 | 9/2016 | Dadoosh et al. | |
| 9,961,976 B2 | 5/2018 | Li et al. | |
| D846,267 S | 4/2019 | Lian | |
| 10,850,760 B2 | 12/2020 | Shapiro et al. | |
| 11,253,034 B2 * | 2/2022 | Malavazos | A45C 5/146 |
| 2002/0096844 A1 * | 7/2002 | Clegg | A45C 13/02 280/43 |
| 2012/0013089 A1 | 1/2012 | Reeves | |
| 2014/0238803 A1 * | 8/2014 | King | A45C 5/146 190/18 A |
| 2018/0125187 A1 * | 5/2018 | Malavazos | A45C 15/00 |
| 2020/0390638 A1 | 12/2020 | Jernigan, IV | |

FOREIGN PATENT DOCUMENTS

| | | | |
|---|---|---|---|
| CN | 206141721 U | | 5/2017 |
| CN | 107187529 A | | 9/2017 |
| CN | 109572899 A | * | 4/2019 |
| CN | 210310429 U | | 4/2020 |
| DE | 10158390 A1 | | 6/2003 |
| EP | 2042421 A1 | | 4/2009 |
| ES | 1069730 U | | 5/2009 |
| KR | 101770940 B1 | | 8/2017 |
| WO | 2014012291 A1 | | 1/2014 |

OTHER PUBLICATIONS

International Search Report and Written Opinion for International Application No. PCT/US2023/081617, mailed on Mar. 21, 2024 (13 pages).

* cited by examiner

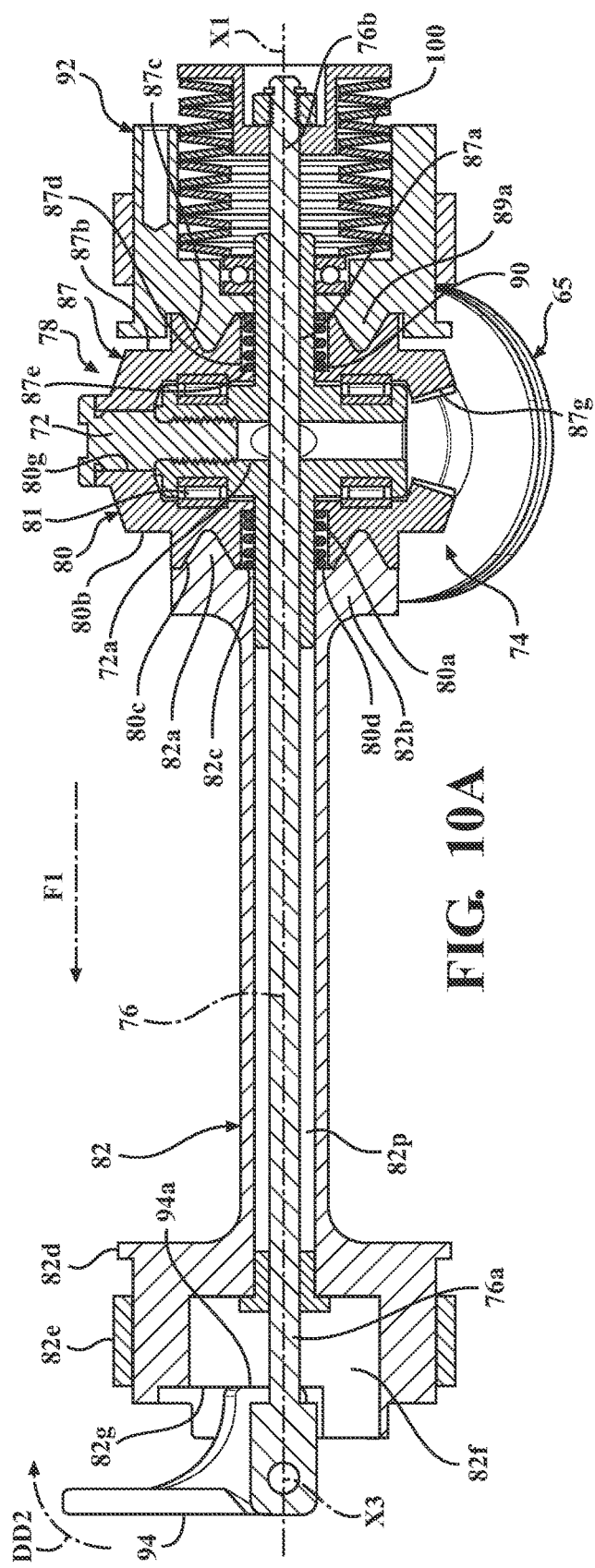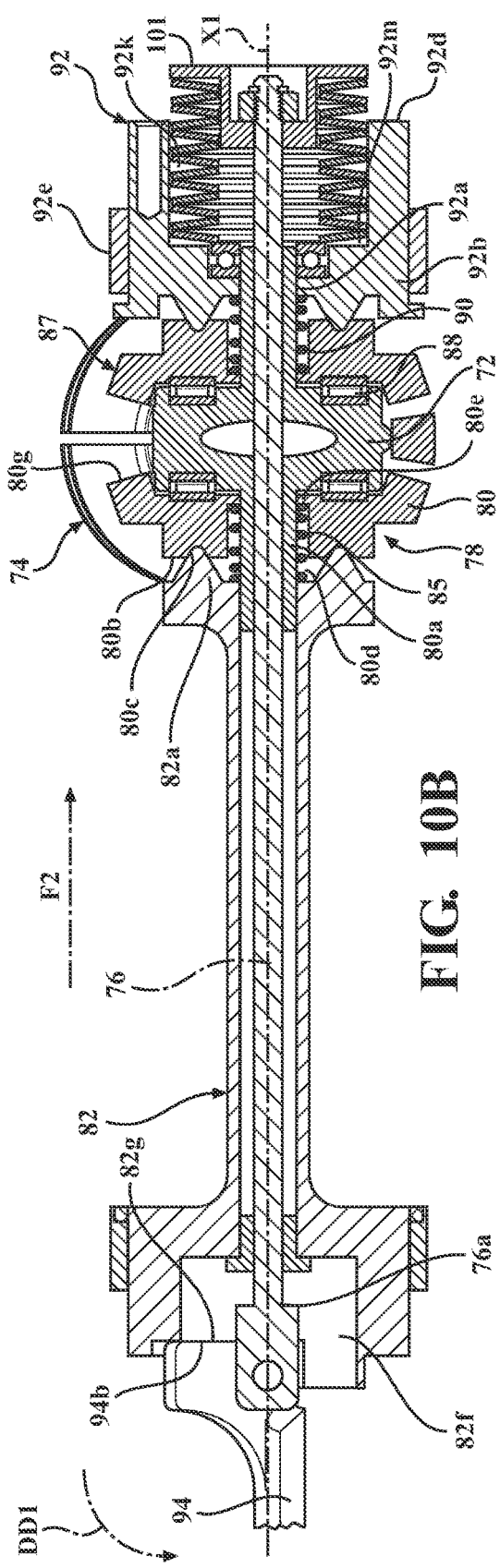

WHEELED LUGGAGE ITEM WITH INTEGRATED PERSONAL MOBILITY CAPABILITY

TECHNICAL FIELD

The embodiments disclosed herein relate to items of luggage and, more particularly, to a wheeled luggage item convertible into a personal mobility device.

BACKGROUND

It is well-known to incorporate wheels into suitcases and other luggage items to facilitate movement of the luggage by users. However, under certain travel conditions, and due to age, fatigue and/or other infirmities, it may prove difficult for a user to roll a luggage item over a required distance.

SUMMARY

In one aspect of the embodiments described herein, a wheeled luggage item is provided. The luggage item includes a base defining an interior cavity, and a liner structured to partition the interior cavity into a first portion and a second portion physically isolated from the first portion. A wheel is rotatably coupled to the base so as to be movable between a stowed position in the cavity second portion and a deployed position outside the cavity second portion.

In another aspect of the embodiments described herein, a wheeled luggage item is provided. The luggage item includes a base and a steerable wheel rotatably coupled to the base so as to be movable between a stowed position and a deployed position. First and second steering levers are rotatably coupled to the base. The first and second steering levers are also operably connected to the wheel so as to enable steering of the wheel by simultaneous rotation of the first steering lever in one of a first rotational direction and a second rotational direction opposite the first rotational direction, and by rotation of the second steering lever in the other one of the first rotational direction and the second rotational direction, when the wheel is in the deployed position.

In yet another aspect of the embodiments described herein, a wheeled luggage item is provided. The luggage item includes a base defining an interior cavity, and a steerable wheel rotatably coupled to the base so as to be movable between a stowed position and a deployed position. First and second steering levers are rotatably coupled to the base. A gear set is operably connected to the first and second steering levers. A torque transfer member is operably connected to the gear set so that simultaneous rotation of the first steering lever in one of a first rotational direction and a second rotational direction opposite the first rotational direction, and of the second steering lever in the other one of the first rotational direction and the second rotational direction, causes rotation of the torque transfer member in an associated torque direction. The luggage item also includes a first steering cable and a second steering cable operably connected to the torque transfer member and to the wheel, so that rotation of the torque transfer member in the associated torque direction causes the wheel to turn in an associated direction when the wheel is in the deployed position.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. Additionally, for simplicity and clarity of illustration, and where appropriate, corresponding or analogous elements of different embodiments of the invention appearing in different figures may have similar reference numerals.

FIG. 10A is a schematic frontal cross-sectional view of the portion of the steering mechanism shown in FIGS. 8 and 9, showing a securement lever of the mechanism in an orientation which rotationally connects the steering levers to the remainder of the steering mechanism to enable steering of the luggage item in the riding mode.

FIG. 10B is the schematic frontal cross-sectional view of FIG. 10A showing the securement lever in an orientation enabling the steering levers to be rotated independently of the remainder of the steering mechanism, into stowed positions along a base of the luggage item.

DETAILED DESCRIPTION

This disclosure relates to a wheeled luggage item that is convertible by a user to either of a transport mode and a riding mode. In the transport mode, a handle of the luggage item may be grasped by a user to roll the luggage item along a ground surface, in the manner of a conventional rollable suitcase. In the riding mode, the luggage item is self-powered and configured to be driven by a user seated on the luggage item. The luggage item includes a base defining an interior cavity, and a liner structured to partition the interior cavity into a first portion and a second portion physically isolated from the first portion. Personal luggage items may be stored in the cavity first portion. First and second wheels are rotatably coupled to the base so as to be movable between stowed positions in the cavity second portion and deployed positions outside the base, to enable a riding mode of the luggage item. Steering levers are rotatably deployable to operably connect to the first wheel, enabling the first wheel to be steered by a user riding the luggage item in the riding mode. To propel the luggage item in the riding mode, a battery in the interior cavity may power an in-wheel motor operably connected to the second wheel. When not in use, the steering levers may be rotated into cavities formed in the base, so that the space occupied by the luggage item conforms to an allowable space envelope of a carry-on suitcase for commercial airline flights.

Figure 1A:
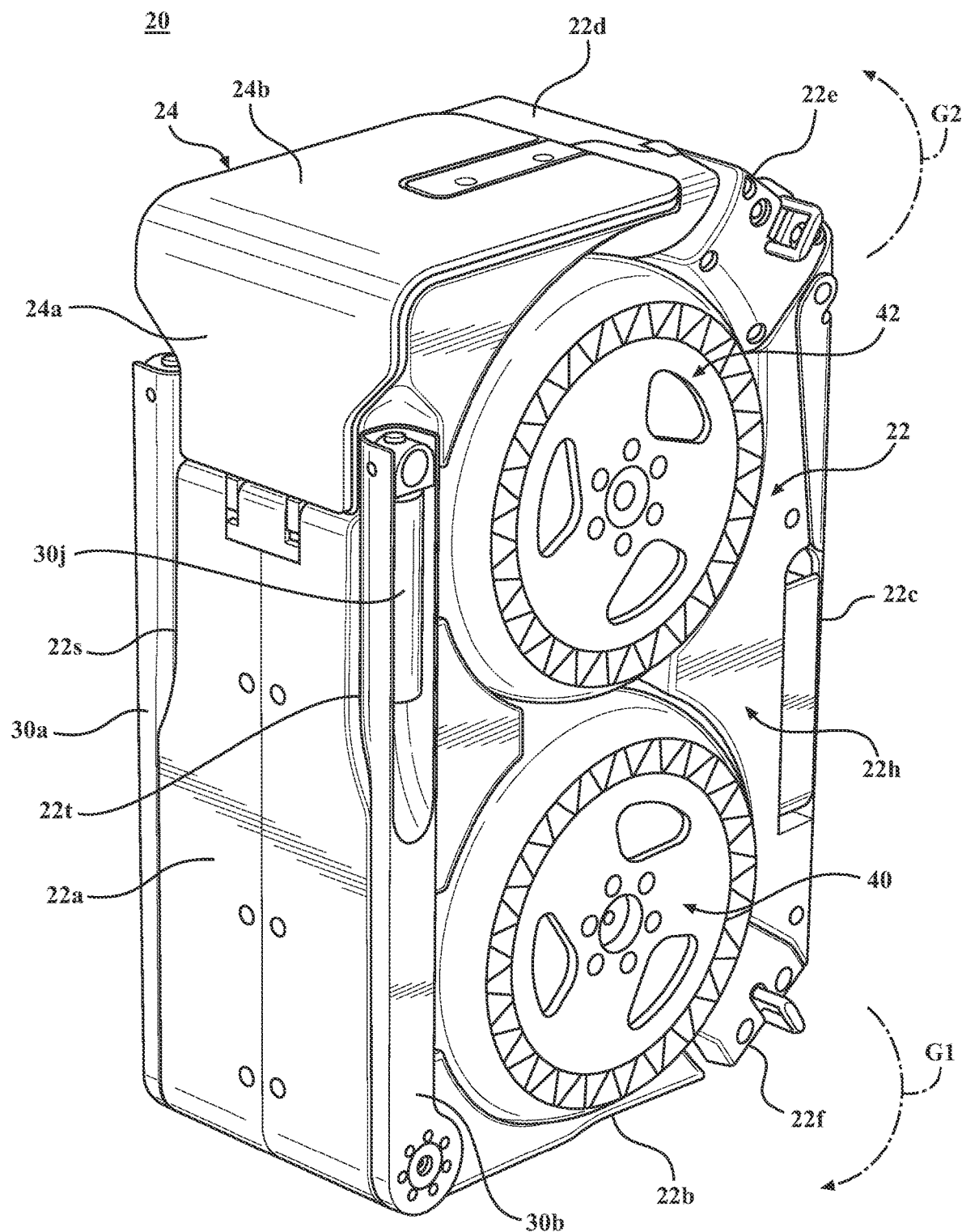
FIGS. 1A and 1B are schematic perspective views of a wheeled luggage item in accordance with embodiments described herein, shown in a transport mode of the luggage item.
Figure 1B:
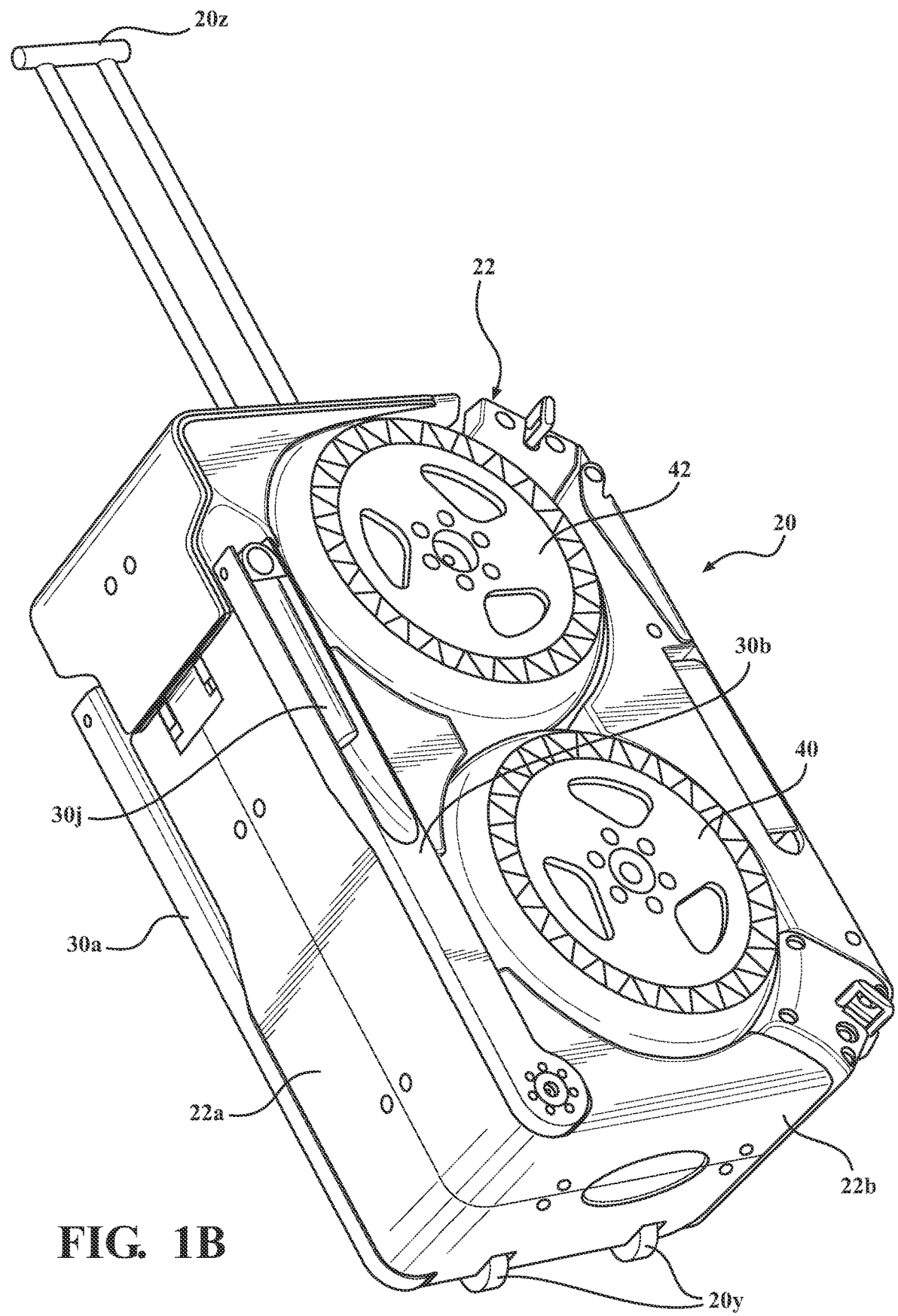
Figure 1C:
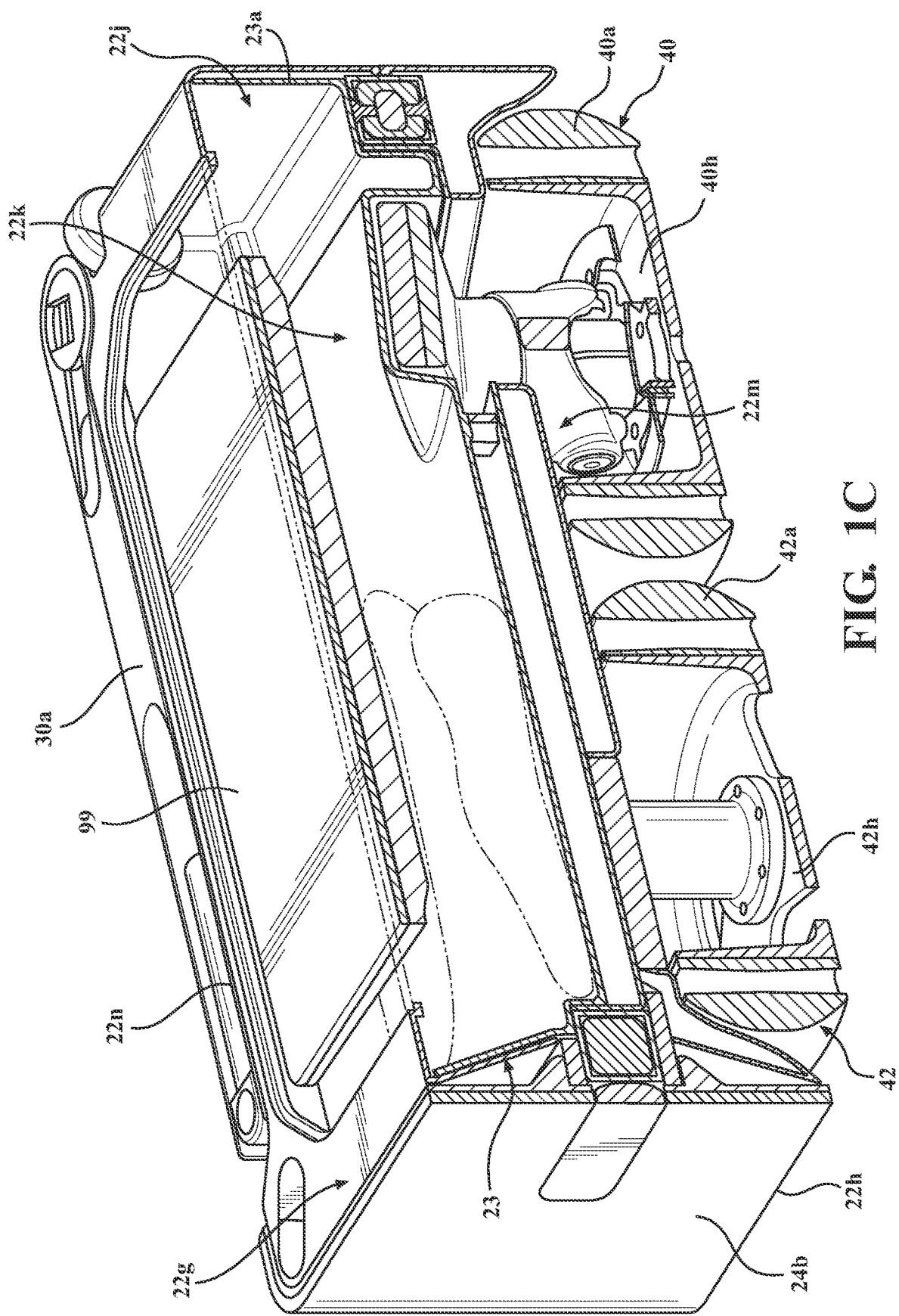
FIG. 1C is a schematic perspective view of the wheeled luggage item of FIGS. 1A and 1B, illustrating stowing of riding wheels of the luggage item in a portion of the interior cavity of the item when the luggage item is in the transport mode.

FIGS. 1A and 1B are schematic perspective views of a wheeled luggage item 20 in accordance with embodiments described herein. FIG. 1A shows the wheeled luggage item 20 in a transport mode in which the luggage item may be manually rolled along a ground surface in the manner of a conventional suitcase or other piece of luggage. In one or more arrangements, the wheeled luggage item 20 may be structured to fit inside an allowable space envelope (e.g., 22 inches×14 inches×9 inches) of a carry-on suitcase for commercial airline flights, when the luggage item is in the transport mode. The wheeled luggage item 20 may be provided with a retractable handle 20z and conventional luggage rollers or wheels 20y (FIG. 1B) to facilitate movement of the luggage item by a user when the luggage item is in the transport mode. FIG. 1B shows the wheeled luggage item 20 with the handle 20z deployed for transport.

Figure 2:
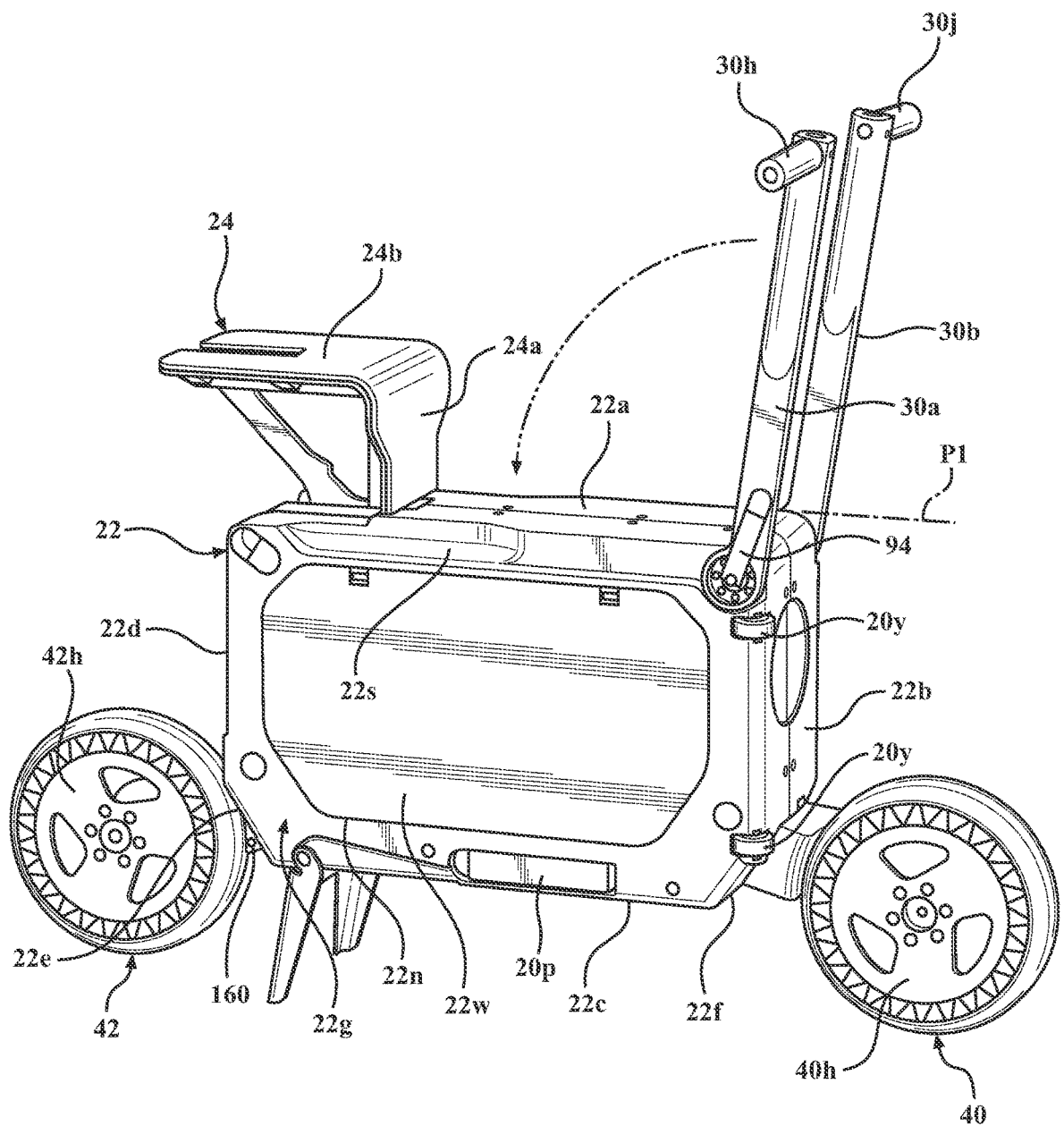
FIG. 2 is a schematic perspective view of the wheeled luggage item of FIGS. 1A and 1B, shown in a riding mode of the device.
Figure 2A:
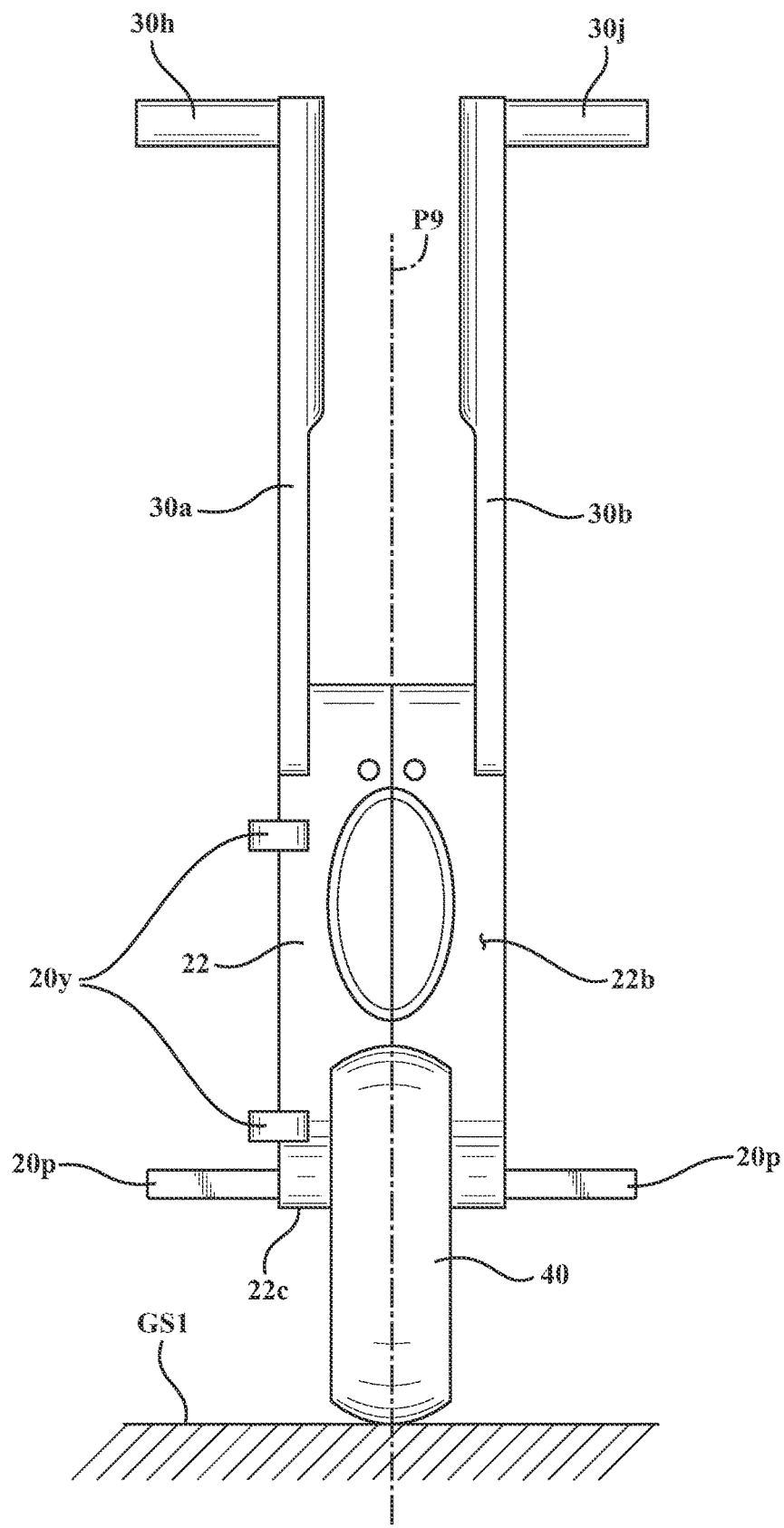
FIG. 2A is a view of the wheeled luggage item of FIGS. 1A and 1B, taken from in front of the device.

FIG. 2 is another schematic perspective view of the wheeled luggage item 20, showing the luggage item in a riding mode. In the riding mode, the wheeled luggage item 20 may be self-propelled and manually guidable using a steering mechanism to enable a user to sit on the luggage item and use it as a mode of personal transportation. FIG. 2A is a front view of the wheeled luggage item 20 in FIG. 2. In the embodiments described herein, the wheeled luggage item 20 is structured to be manually convertible between the transport mode and the riding mode, according to the needs of a user.

As used herein, elements are "rotationally connected" and "rotationally connectible" to each other when they are connected so as to rotate together, in conjunction with each other. Elements are "detachably rotationally connected" when the rotational connection between the elements may be disabled or interrupted by certain operations on the wheeled luggage item (e.g., rotation of the securement lever 94 to a first position to enable free rotation of the steering levers 30a. 30b, or sliding contact between coupling members and associated gear blocks responsive to application of excessive steering torque to the steering levers, as described herein). Elements are "rotatably coupled" to each other when they are operably connected so that they are rotatable with respect to each other (i.e., rotatable individually or separately) or such that one of the elements is rotatable with respect to another element. In addition, the term "operably connected," as used throughout this description, can include direct or indirect connections, including connections without direct physical contact.

Referring to FIGS. 1A-4, in one or more arrangements, the wheeled luggage item 20 may include a base 22. The base 22 may include interconnected walls forming a flat first edge 22a defining a first plane P1, a flat second edge 22b extending from the first edge 22a, a flat third edge 22c extending opposite the first edge 22a, and a flat fourth edge 22d extending from the first edge 22a toward the third edge and defining a second plane P2. A first beveled edge 22e may connect the third edge 22c with the fourth edge 22d, and a second beveled edge 22f may connect the second edge 22b with the third edge 22c.

Figure 4:
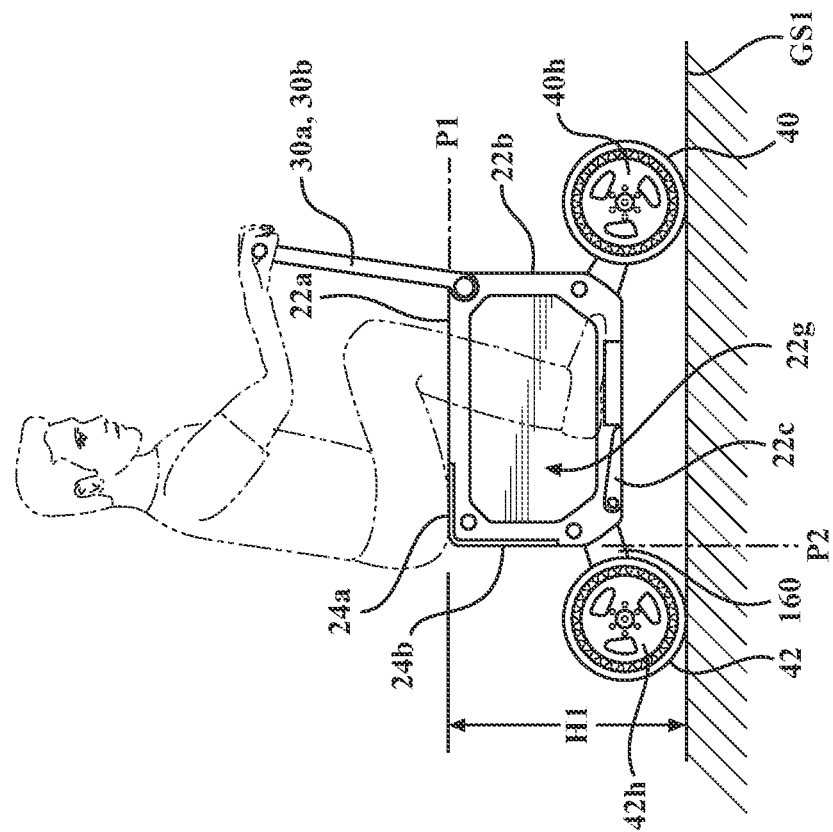
FIG. 4 is a schematic side view of the wheeled luggage item of FIG. 2, showing a user or rider seated on a seat structure of the device with the seat structure in a stowed or lowered orientation.

As seen in FIG. 4, a portion of the first edge 22a may define a seating surface for a user when the wheeled luggage item 20 is in the riding mode. In addition, the first edge 22a may be structured to form a top or uppermost edge of the wheeled luggage item 20. The second edge 22b may be structured to form a forward or front edge of the wheeled luggage item 20 and the fourth edge 22d may be structured to form a rear edge of the wheeled luggage item 20 when the wheeled luggage item 20 is in the riding mode. The third edge 22c may be structured to form a lowermost or bottom edge of the base 22 when the wheeled luggage item 20 is in the riding mode.

Referring to FIGS. 1A-4, the wheeled luggage item 20 may include a seat structure 24 having a first portion 24a and a second portion 24b extending from the first portion. The seat structure 24 may be operably connected to the base 22 so as to be rotatable relative to the base 22 between a first (stowed) orientation (shown in FIGS. 1A, 1B and 4) and a second (raised) orientation (shown in FIGS. 2 and 3). The first portion 24a may form a seating surface positioned at a first height H1 above a ground surface GS1 when the seat structure 24 is in the first orientation and the wheeled luggage item 20 is in the riding mode. Also, the second portion 24b may form a seating surface positioned at a second height H2 above the ground surface GS1 when seat structure 24 is in the second orientation and the wheeled luggage item 20 is in the riding mode, with the second height H2 being greater than the first height H1. The seat structure 24 may be rotated to the raised orientation of FIGS. 2 and 3 for relatively taller users. A releasable locking mechanism (not shown) may be provided to maintain the seat structure 24 in the second orientation when raised. When the seat structure 24 is in the stowed orientation, the first portion 24a may extend along the base first edge 22a so as to be coplanar of flush with the first edge along plane P1, and the second portion 24b may extend along a portion of the base fourth edge 22d and coplanar or flush with a plane P2 of the fourth edge 22d. One or more cushions may extend along the seat structure first and second portions 24a and 24b for the comfort of the rider. In some arrangements, a gusset 24c may extend between the first and second portions 24a. 24b to help support the seating surface S2 when the seat structure is raised.

The base 22 may also include a first face 22g and a second face 22h extending opposite the first face 22g. First face 22g may extend between base edges 22a-22f to connect the edges along respective first sides of the base edges. Similarly, second face 22h may extend between base edges 22a-22f to connect the edges along respective second sides of the base edges.

A first steering lever receptacle 22s may be formed extending between the first edge 22a and the first face 22g. First steering lever receptacle 22s may be structured to receive therein a first steering lever 30a (described in greater detail below) when the first steering lever 30a is rotated to a stowed orientation of the first steering lever (shown in FIG. 1). Similarly, a second steering lever receptacle 22t may be formed extending between the first edge 22a and the second face 22h. Second steering lever receptacle 22t may be structured to receive therein a second steering lever 30b (described in greater detail below) when the second steering lever 30b is rotated to a stowed orientation of the second steering lever (shown in FIGS. 1A-1B).

Figure 5:
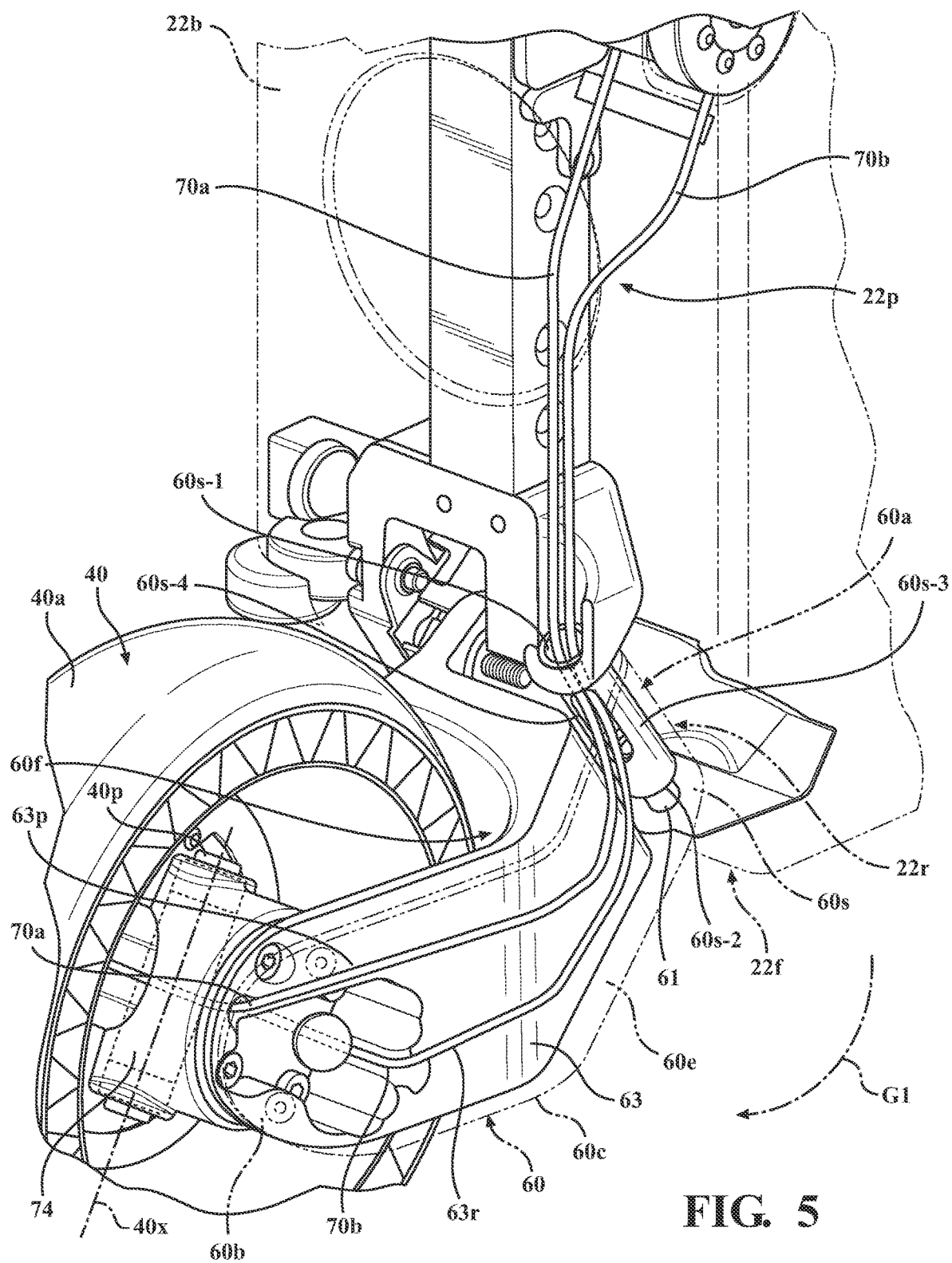
FIG. 5 is a schematic perspective view of a front portion of the luggage item in a riding mode, showing a mounting bracket structured for connecting a steerable wheel to a base of the luggage item, and with the wheel secured in a deployed position.

Referring to FIGS. 1-5, in combination, the base edges 22a-22f and the first and second faces 22g. 22h may define an interior cavity 22j of the base 22. The interior cavity 22j may be structured for receiving and/or storing therein elements such as luggage to be transported in the base and other portions of the wheeled luggage item 20. A liner 23 may be structured to partition the interior cavity 22j into a first portion 22k and a second portion 22m adjacent but physically isolated from the first portion 22k so as to prevent objects from moving between the first portion 22k and second portion 22m. The liner 23 may be formed from a molded polymer, for example. As seen in FIG. 5, outer edges 23a of the liner 23 may abut or reside adjacent walls of the base 22 forming the edges 22a-22f of the base 22, to make maximum use of the space inside the base 22 for storage.

The interior cavity first portion 22k may form a receptacle structured for storing luggage and other items for transportation by a user. Access to the interior cavity first portion 22k may be via an opening 22n formed along the first face 22g. The opening 22n may be closed by a door 22w (FIG. 2) operably connected to the base first face 22g. The door 22w may be connected to the base 22 so as to be rotatable with respect to the remainder of the base 22 or otherwise movable away from the opening 22n so as to open and enable user access to the contents of interior cavity first portion 22k. The door 22w may have a relatively soft, flexible structure or a relatively hard, firm structure. The door 22w may be securable in a closed position along the first face 22g to maintain the luggage items inside the interior cavity first portion 22k during movement of the wheeled luggage item 20. For example, the door 22w may be securable in the closed position using a zipper, a latch, or any other suitable mechanism. In particular arrangements, the door 22w may have a pocket (not shown) (for example, a sleeve for storing and transporting a laptop computer 99) mounted on a portion of the door 22w facing the interior cavity first portion 22k.

The interior cavity second portion 22m may be structured to form a wheel receptacle for receiving therein first and second wheels 40, 42 (described in greater detail below) of the wheeled luggage item 20. Wheels 40, 42 may be structured to be deployable from the interior cavity second portion 22m as described herein, to enable a user to ride the wheeled luggage item 20 in the riding mode.

Referring to FIG. 2A, a pair of foot pegs 20p may be rotatably mounted to the base 22 along faces 22g and 22h. The foot pegs 20p may be rotatably extended to support a user's feet in the riding mode and rotated to reside inside associated foot peg cavities formed in the faces 22g. 22h.

Referring to FIG. 5, a wheel hinge pin sleeve receptacle 22r may be formed in the base interior cavity 22j along the second beveled edge 22f. Receptacle 22r may be structured to receive therein a hinge pin sleeve 60s of a wheel mounting bracket 60 (described in greater detail below), to enable rotatable coupling of the wheel mounting bracket to the base 22 via a hinge pin 61 extending through the sleeve 60s. Each end of the hinge pin 61 may then be secured to an associated portion of the base 22 inside the base interior cavity 22j. The wheel mounting bracket 60 and an attached first, steerable wheel 40 may then rotate into (and out of) the interior cavity second portion 22m for stowage and deployment.

Referring to FIG. 5, a steering cable passage 22p may be formed inside the base interior cavity 22j so as to extend along base second edge 22b. Steering cable passage 22p may be structured to receive therein a pair of steering cables 70a, 70b (described in greater detail herein) operably connecting the steering levers 30a and 30b to the first wheel 40 supported by the wheel mounting bracket 60. The steering cable passage 22p may be structured to guide and protect the steering cables 70a, 70b extending through the passage.

Figure 1D:
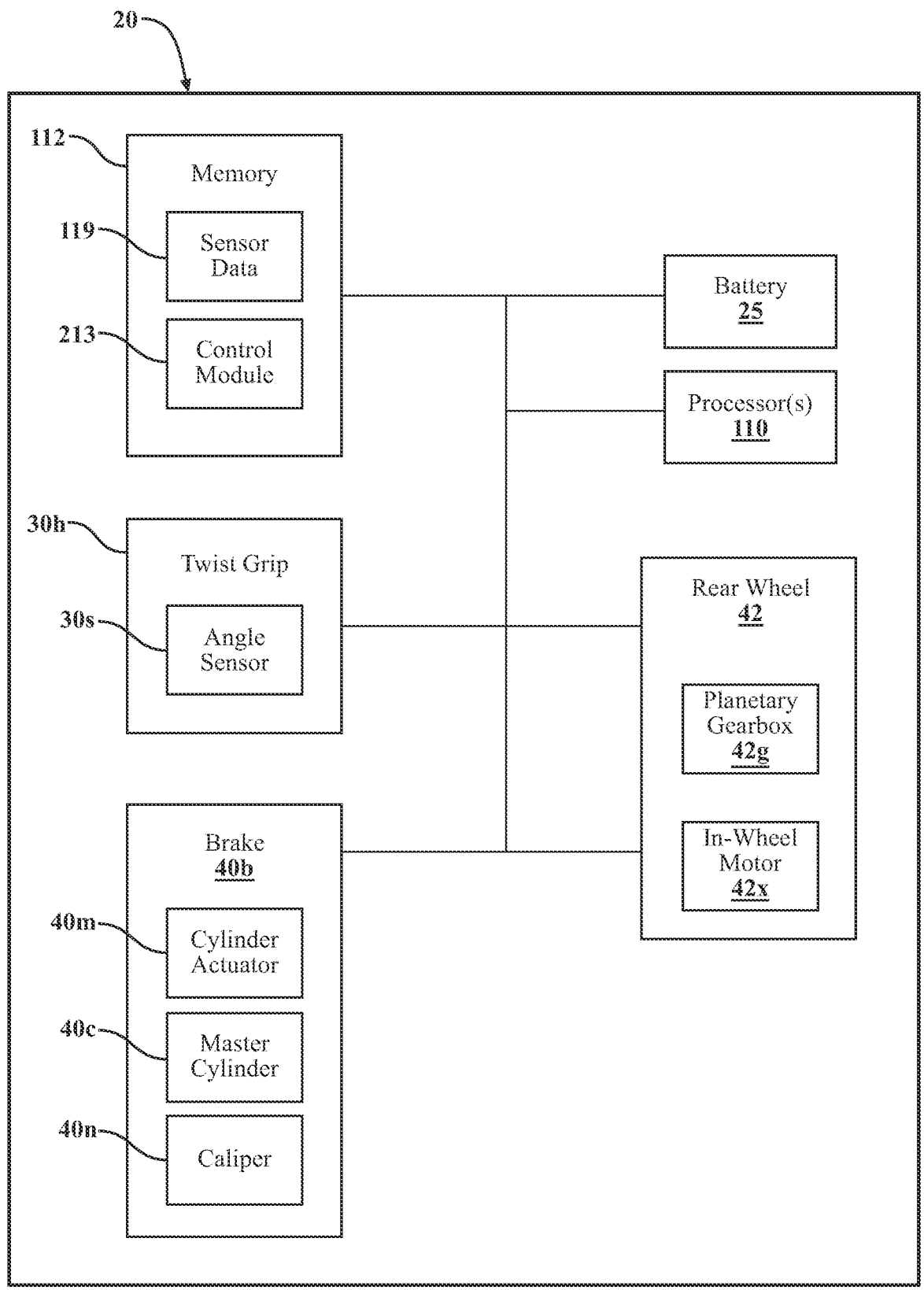
FIG. 1D is a block schematic diagram of a wheeled luggage item in accordance with embodiments described herein, showing braking, throttle, and control systems of the luggage item for use in the riding mode.
Figure 5A:
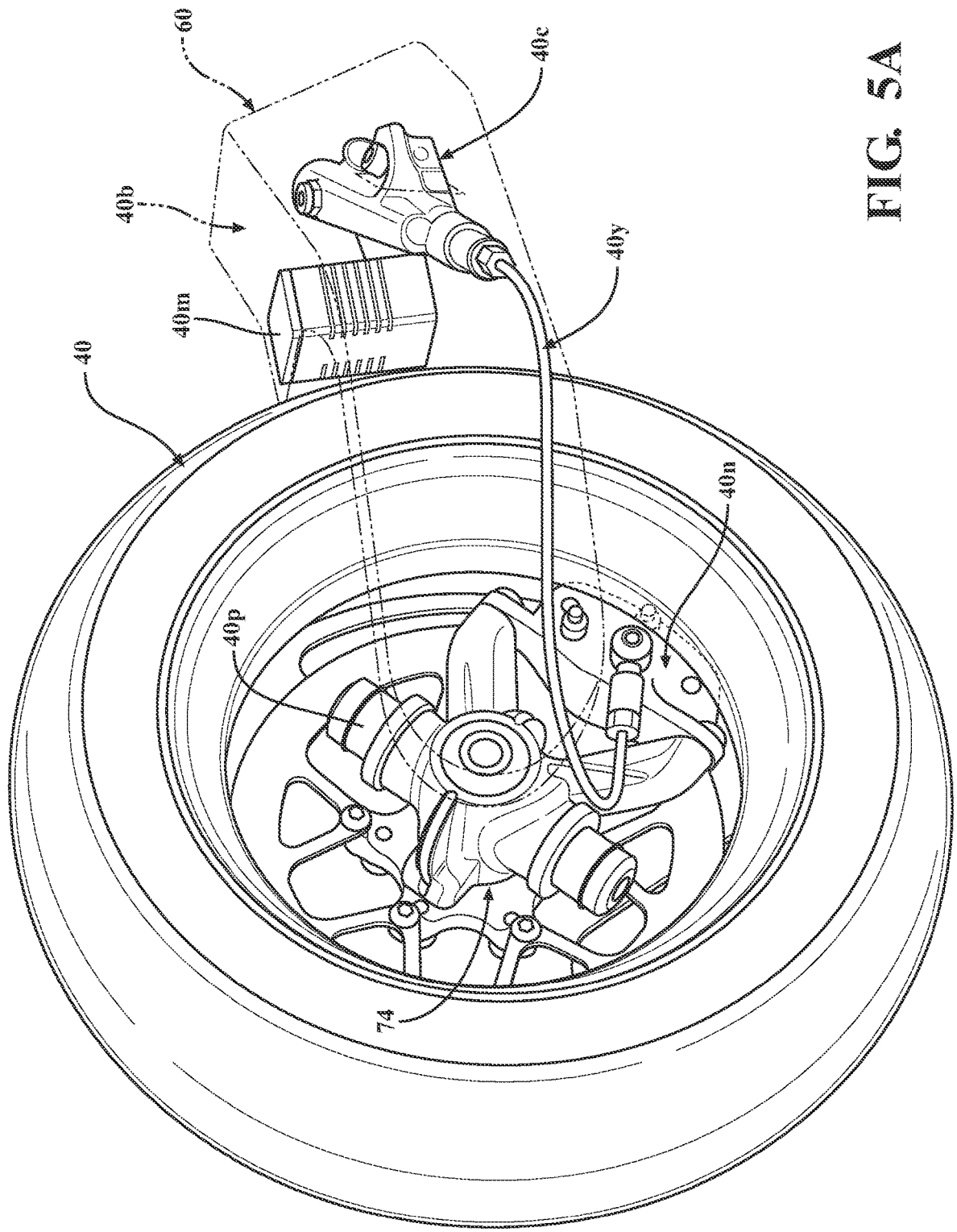
FIG. 5A is schematic perspective view of the front portion of the luggage item shown in FIG. 5, showing a brake incorporated into the front mounting bracket and steerable wheel.

Referring to FIGS. 1D and 5A, elements of a brake 40b may be incorporated into the first wheel 40 and the mounting bracket 60. In one or more arrangements, the brake 40b may be a conventional hydraulic disc brake or another type of mechanical brake. In particular arrangements, the brake may include an actuator 40m (e.g., a servomotor) and a brake master cylinder 40c connected to a caliper 40n by a hose 40y and operable to pressurize the caliper 40n to engage the first wheel 40, to slow and stop forward motion of the luggage item 20. The actuator 40m may be operably connected to the luggage item control module 213 (described in greater detail below) to receive control signals from the control module 213.

Figure 6:
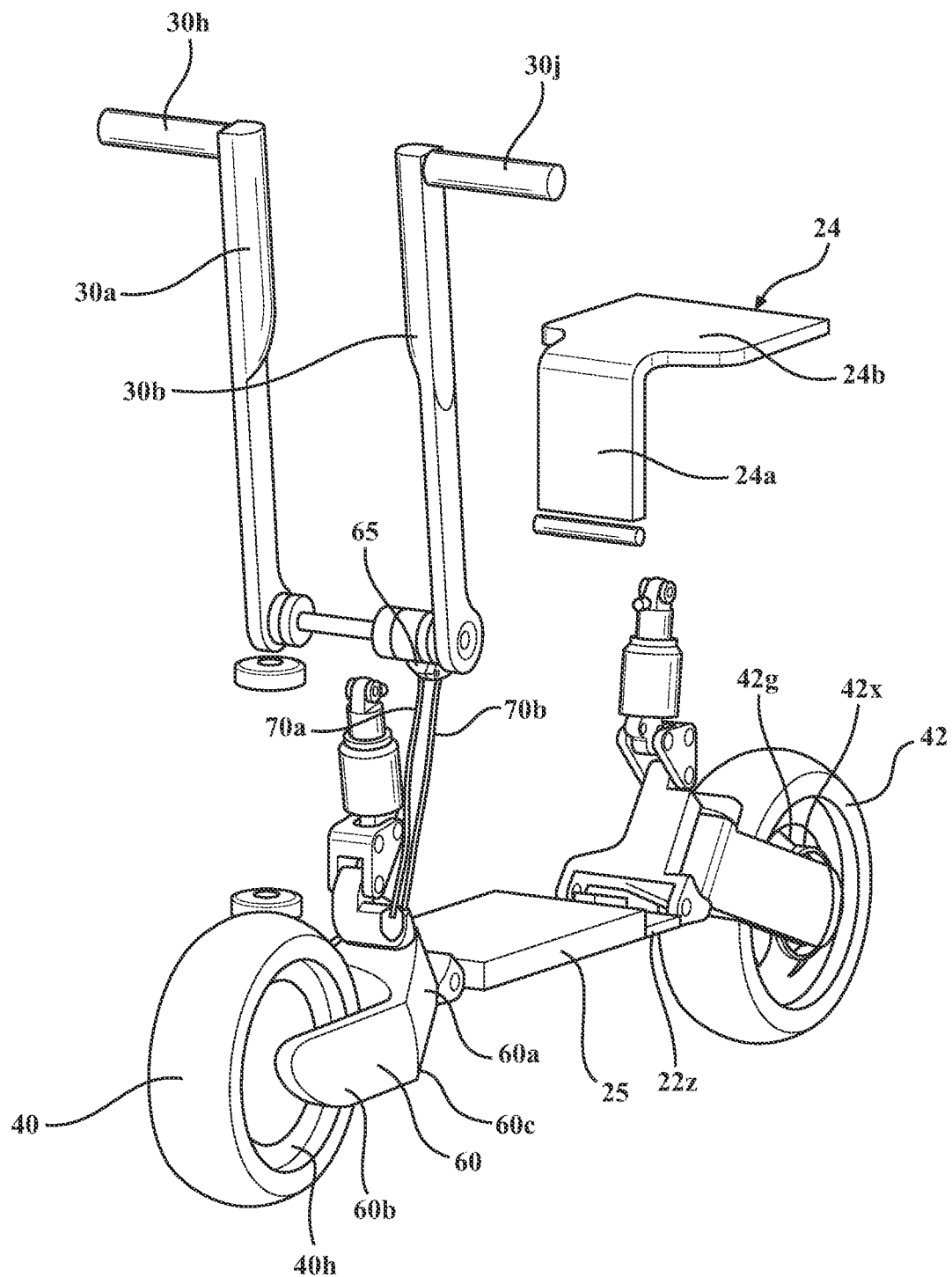
FIG. 6 is a schematic perspective view of a support frame of the luggage item of FIG. 2 supporting front and rear wheels of the luggage item, with the front and rear wheels in deployed positions for the riding mode.

Referring to FIG. 6, a support frame 22z may extend along base third edge 22c within the interior cavity 22j to enable rotatable coupling of the first and second wheels 40, 42 to the base 22. Mounting brackets 60, 160 supporting the first and second wheels 40, 42, respectively, may be rotatably mounted to the support frame 22z by associated first and second rotatable coupling mechanisms (not shown) so as to enable stowage and deployment of the first and second wheels 40, 42 from the interior cavity second portion 22m as described herein.

Figure 3:
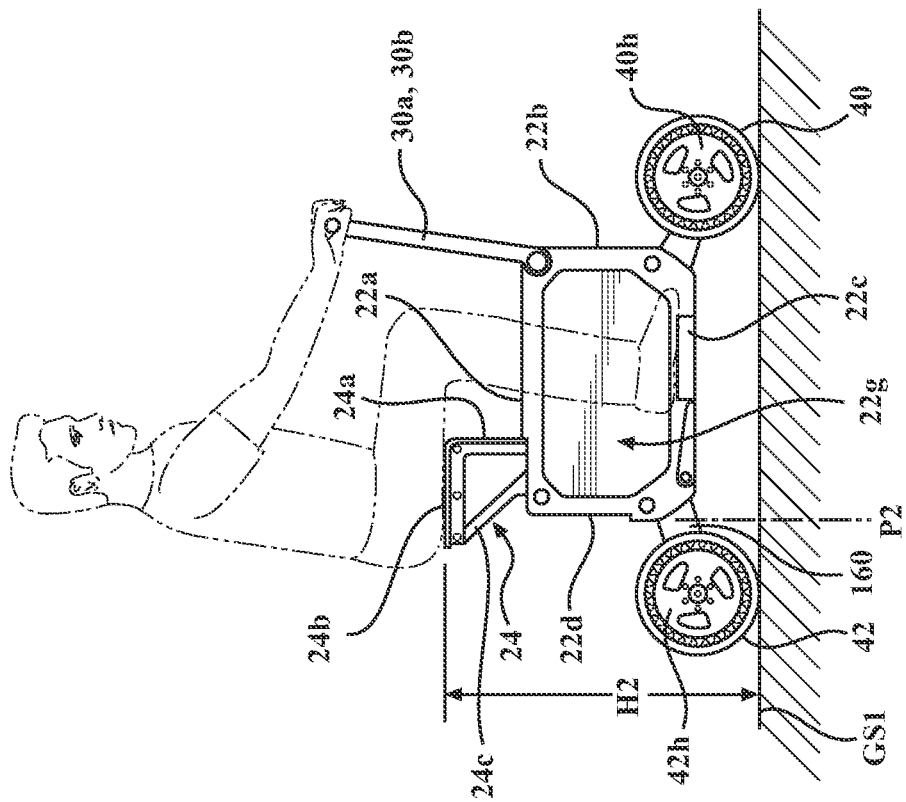
FIG. 3 is a schematic side view of the wheeled luggage item of FIG. 2, showing a user or rider seated on a seat structure of the device with the seat structure in a raised orientation.

Referring again to FIG. 5, wheel mounting bracket 60 may be rotatably coupled to the frame 22z by hinge pin 61 for rotatably supporting first wheel 40 thereon. The wheel mounting bracket 60 and wheel 40 may be structured to be securable in a first (stowed) orientation in which the first wheel 40 rotatably coupled to the mounting bracket 60 is received (and maintained) in the base interior cavity second portion 22m. The wheel mounting bracket 60 and wheel 40 may also be structured to be securable in a second (deployed) orientation in which the first wheel 40 rotatably coupled to the mounting bracket 60 is maintained in a deployed position of the first wheel 40. A locking mechanism (not shown) may be operably connected to the mounting bracket 60 for securing the mounting bracket in the deployed orientation to support the deployed first wheel 40. As seen in FIGS. 3 and 4, the wheel mounting bracket may 60 be rotatably coupled to the base 22 so as to support the first wheel 40 so that first wheel extends below a lowermost portion of the base 22 (in this case, the third edge 22c of the base) when the first wheel 40 is locked in a deployed position and in contact with the ground surface GS1.

Referring to FIG. 5, the wheel mounting bracket 60 may have a first end 60a rotatably coupled to the base 22. The hinge pin sleeve 60s (previously described) may be located proximate bracket first end 60a and structured to receive the hinge pin 61 therein, for rotatably securing the wheel mounting bracket 60 to the base 22. The hinge pin sleeve 60s may have a first open end 60s-1, a second open end 60s-2 opposite the first open end 60s-1, and a body portion 60s-3 extending between the first and second ends. The body portion 60s-3 may be structured to enable portions of the steering cables 70a, 70b to be routed therethrough. In addition, an opening 60s-4 may be formed in body portion 60s-3 to enable steering cables 70a, 70b entering the sleeve 60s at first end 60s-1 to exit the sleeve 60s along the body portion 60s-3.

The wheel mounting bracket 60 may also have a second end 60b (i.e., a wheel support end) opposite the first end 60a. As seen in FIG. 5, a steering knuckle 74 may be incorporated into the wheel mounting bracket second end 60b. A hub 40h of the first wheel 40 may be rotatably coupled to the steering knuckle 74 in a known manner by a kingpin 40p, so that the first wheel hub 40h and first wheel 40 are rotatable about a kingpin axis 40x of the kingpin 40p. Rotation of the first wheel 40 about the kingpin axis 40x changes the direction in which the wheel 40 is pointing to effect steering of the wheeled luggage item 20 by a user, in the manner described herein.

Figure 7:
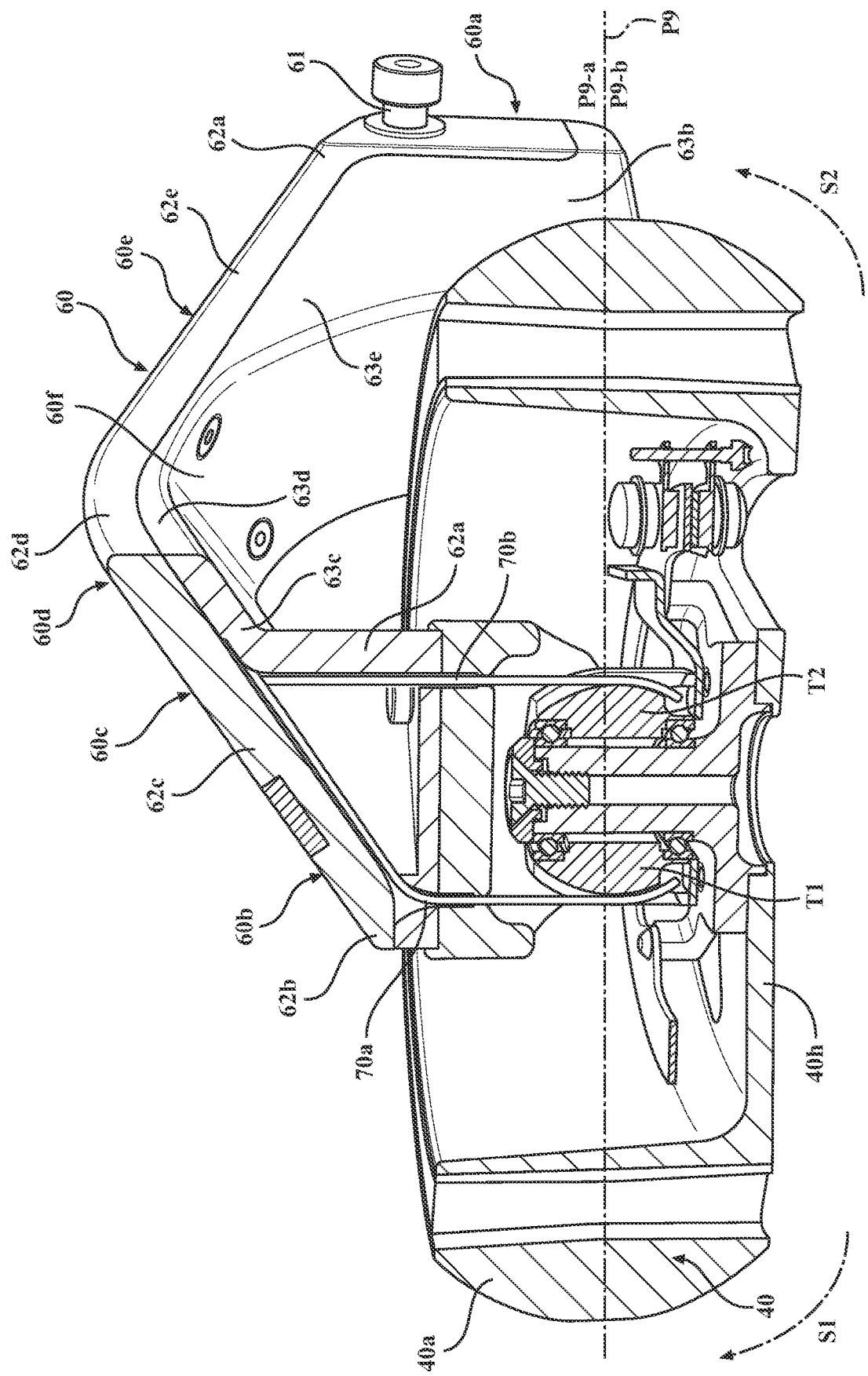
FIG. 7 is a schematic cross-sectional view of a portion of a first or front wheel of the luggage device in the deployed position, taken from an underside of the wheel and showing the connection of steering cables to the hub of the wheel.

As seen in FIGS. 5, 6 and 7, the wheel mounting bracket 60 may also include an outwardly extending body portion 60c structured to extend from the mounting bracket second end 60b in a direction away from a fore-aft plane P9 (FIG. 7) of the base 22 when the mounting bracket 60 supports the wheel 40 in the deployed position of the wheel. As seen in FIG. 2A, considering the wheeled luggage item 20 to be a vehicle when it is in the riding mode and the base 22 to be analogous to a body of the vehicle, the fore-aft plane P9 of the base 22 may be a vertical plane extending through a fore-aft axis of the base 22 when the base is positioned in the riding mode. Referring again to FIGS. 5-7, an inwardly extending portion 60e of the mounting bracket 60 may be structured to extend from an end 60d of the outwardly extending body portion 60c in a direction toward the fore-aft plane P9 of the base 22 when the mounting bracket 60 supports the wheel 40 in the deployed position of the wheel. The outwardly extending body portion 60c and the inwardly extending portion 60e may combine combining to define a cavity 60f therebetween. Referring to FIG. 7, the cavity 60f may be structured to receive a portion of the wheel 40 therein as the wheel turns in a direction S2, as described in greater detail below.

Referring to FIGS. 5 and 7, in particular arrangements, the mounting bracket 60 may have a two-piece structure formed by combining an outer bracket member 62 and the inner bracket member 63. The outer bracket member 62 and the inner bracket member 63 may be bolted or otherwise secured together. In such arrangements, the outer bracket member 62 may have an associated first end 62a and a second end 62b opposite the first end. The first end 62a may incorporate hinge pin sleeve 60s therealong. The outer bracket member 62 may have a basic structure similar to that previously described with respect to the overall mounting bracket 60. That is, the outer bracket member 62 may have an outwardly extending body 62c portion structured to extend from the outer bracket member second end 62b in a direction away from a fore-aft plane P9 of the base 22 when the mounting bracket 60 supports the first wheel 40 in the deployed position of the first wheel. The outer bracket member 62 may also have an inwardly extending body portion 62e structured to extend from an end 62d of the outwardly extending body portion 62c in a direction toward the fore-aft plane P9 and outer bracket member first end 63a when the mounting bracket 60 supports the first wheel 40 in the deployed position of the wheel.

In two-piece arrangements, the inner bracket member 63 may also have an associated first end 63a and second end 63b opposite the first end 63a. The inner bracket member 63 may also have a basic structure similar to that previously described with respect to the overall mounting bracket 60. That is, the inner bracket member 63 may have outwardly extending portion 63c structured to conform to an inner surface of the outer bracket member outwardly extending portion 62c. The inner bracket member 63 may also have an inwardly extending portion 63e structured to extend from an end 63d of the outwardly extending portion 63c in a direction toward the toward the fore-aft plane P9 of the base when the mounting bracket 60 supports the first wheel 40 in the deployed position of the wheel, thereby conforming to the inwardly extending portion 62e of the outer bracket member 62 for attachment thereto. The outwardly extending portion 63c and the inwardly extending portion 63e of the inner bracket member 63 may combine to define the cavity 60f therebetween.

Referring to FIGS. 5 and 7, the inner bracket member 63 may also include a first passage formed 63p therealong and structured to receive a portion of first steering cable 70a therein. The inner bracket member 63 may also include a second passage 63r formed therealong and structured to receive a portion of second steering cable 70b therein. When the outer bracket member 63 is secured to the inner bracket member 62 to form the mounting bracket 60, the portions of the steering cables 70a. 70b extending along the passages 63p, 63r may be secured between the outer and inner bracket members 62, 63. Thus, the passages 63p, 63r may aid in guiding the steering cables 70a, 70b from the torque transfer member 65 (described below) to respective connection locations on the first wheel hub 40h. In some arrangements, the locking mechanism for securing the mounting bracket 60 in the deployed orientation may be incorporated into (or operably connected to) the inner bracket member 63. Using the mounting bracket 60, wheel 40 may be rotatably coupled to the base 22 so as to be movable between the stowed position in the cavity second portion 22m and a deployed position outside the cavity second portion.

Referring to FIGS. 5 and 7, the first, steerable wheel 40 may be rotatably coupled to the base 22 so as to be movable between a stowed position and a deployed position. In one or more arrangements, the first wheel 40 is rotatably coupled to the base 22 by rotatably coupling the wheel to the mounting bracket second end 60*b*. The first wheel 40 may include a tire 40*a* and a wheel hub 40*h* supporting the tire. An end of first steering cable 70*a* may exit its associated mounting bracket passage 63*p* for connection to hub 40*h* along a first side T1 of the hub. Also, an end of second steering cable 70*b* may exit its associated mounting bracket passage 63*r* for connection to hub 40*h* along a second side T2 of the hub 40*h* opposite the first side of the hub. In a manner described herein, operable connection of first steering cable 70*a* to the first side T1 of the wheel hub 40*h* enables application of a force to the first cable 70*a* by rotation of the torque transfer member 65 (described below) to turn the wheel 40 in a first direction S1 about the kingpin axis 40*x*. Also, operable connection of second steering cable 70*b* to the second side T2 of the wheel hub 40*h* enables application of a force to the second cable 70*b* by rotation of the torque transfer member 65 in an opposite direction to turn the wheel 40 in a second direction S2 about the kingpin axis 40*x*, opposite the first direction S1. In one or more arrangements, the first wheel 40 may be rotatably coupled to the mounting bracket second end 60*b* along a single side of the wheel 40, as shown in FIGS. 5 and 7.

Referring to FIGS. 8-10C, the wheeled luggage item 20 may be provided with a steering mechanism to enable a user seated on the wheeled luggage item to steer the item using the first and second steering levers 30*a*, 30*b*. Steering lever 30*a* may have a steering handle 30*h* suitable for grasping by a right hand of a user during riding. Steering lever 30*b* may have a steering handle 30*j* suitable for grasping by a left hand of the user during riding.

Figure 2B:
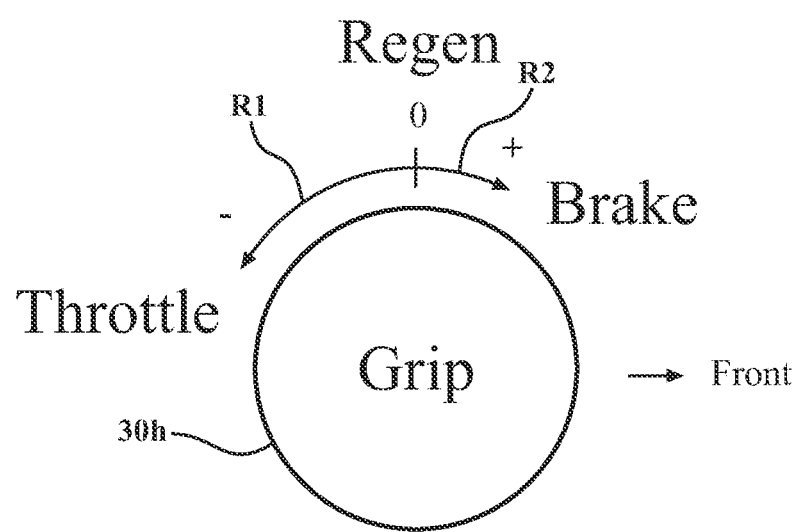
FIG. 2B is a schematic end view of a steering handle of the luggage item incorporating a twist grip, showing operation of the twist grip to control throttle and braking of the luggage item when in the riding mode.

In one or more arrangements, one of steering handles (e.g., steering handle 30*h* in the embodiment shown) may be embodied as a twist grip structured to be manually rotatable while the user is riding the luggage item in the riding mode. Referring to FIGS. 1D and 2B, the twist grip 30*h* may incorporate (or be operably connected to) and angle sensor 30*s* configured to detect an angle that the twist grip is rotated in a first direction R1 or a second direction R2 opposite the first direction. As seen in FIG. 2B, in some arrangements, the first direction R1 may be toward a rearward-facing direction of the luggage item in the riding mode, and the second direction R2 may be toward a forward-facing direction of the luggage item in the riding mode. As described herein, the luggage item 20 may be configured so that rotation of the twist grip 30*h* in the first direction R1 controls operation of the second wheel motor 42*x* to propel the luggage item forward. The luggage item 20 may also be configured so that rotation of the twist grip 30*h* in the second direction R2 controls operation of a brake 40*b* mounted in the first (front) wheel 40, to slow and halt forward motion of the luggage item. The angle sensor 30*s* may have a wired connection or other operable connection to a control module 213 (described in greater detail below) mounted in the base interior cavity second portion 22*m*.

In one or more arrangements, the steering mechanism may include a gear carrier 72 fixedly mounted on a support structure (not shown) located in a portion of the base interior cavity 22*j* exterior of the liner 23 and interior of a base outer wall forming the base second edge 22*b*. The gear carrier 72 may have a central opening 72*a* extending therethrough to accommodate passage of a securement shaft 76 therethrough.

A gear set (generally designated 78) may be supported (using bearings, for example) on the gear carrier 72 so as to enable gears of the gear set to rotate as described herein, within the portion of the base interior cavity 22*j*. The gear set 78 may be structured to exert forces on the steering cables 70*a*, 70*b* extending through the base 22, responsive to rotation of the steering levers 30*a*, 30*b* as described herein.

A first gear block 80 may be rotatably coupled to gear carrier 72 using one or more bearings 81. The first gear block 80 may have a central through-opening 80*a* to enable passage of the securement shaft 76 therethrough. The first gear block 80 may have a rotational axis X1. The first gear block 80 may have a first, outwardly-facing side 80*b* with a first plurality of angularly spaced-apart detent receptacles 80*c* extending along the first side. The detent receptacles 80*c* may be structured to detachably engage complementary detent projections 82*a* formed on a first coupling member 82 (described in greater detail below) by receiving each detent projection 82*a* between a pair of angularly adjacent detent receptacles 80*c*.

A spring-receiving cavity 80*d* may be formed adjacent the opening 80*a* and extending into the opening from the first side 80*b*. The opening 80*a* may have a shoulder 80*e* structured for supporting a first spring 85 (such as a coil spring) received therein. The first gear block 80 may also have a second, inwardly-facing side 80*f* positioned opposite the first side 80*b*. A first bevel gear 80*g* may be formed along the first gear block second side 80*f*. The first bevel gear 80*g* may be structured to meshingly engage multiple pinion gears 86 rotatably coupled to the gear carrier 72, in a manner described herein. Thus, the detent receptacles 80*c* and the first bevel gear 80*g* are rotationally connected.

First spring 85 may be positioned in spring-receiving cavity 80*d* and may be structured to exert a force urging first coupling member 82 (described in greater detail below) away from the first gear block 80, to disengage detent projections 82*a* of the first coupling member 82 from associated ones of the first gear block detent receptacles 80*c* when a force maintaining the detent projections 82*a* in engagement with the detent receptacles 80*c* is released.

A second gear block 87 may be rotatably coupled to gear carrier 72 using one or more bearings 88. The second gear block 87 may have a central through-opening 87*a* to enable passage of the securement shaft 76 therethrough. The second gear block 87 may have a rotational axis coaxial with the first gear block rotational axis (i.e., along axis X1). The second gear block 87 may have a first, outwardly-facing side 87*b* with a second plurality of angularly spaced-apart detent receptacles 87*c* extending along the first side. The detent receptacles 87*c* may be structured to detachably engage complementary detent projections 89*a* formed on a second coupling member 92 (described in greater detail below) by receiving each detent projection 89*a* between a pair of angularly adjacent detent receptacles 87*c*. A spring-receiving cavity 87*d* may be formed adjacent the opening 87*a* and extending into the opening from the first side 87*b*. The opening 87*a* may have a shoulder 87*e* structured for supporting a second spring 90 (such as a coil spring) received therein.

The second gear block 87 may also have a second, inwardly-facing side positioned opposite the first side 87*b*. A second bevel gear 87*g* may be formed along the second gear block second side. The second bevel gear 87*g* may be structured to meshingly engage the multiple pinion gears 86 rotatably coupled to the gear carrier 72, in a manner described herein. Thus, the detent receptacles 87*c* and the second bevel gear 87*g* are rotationally connected.

Second spring 90 may be positioned in spring-receiving cavity 87*d* and may be structured to exert a force urging a second coupling member 92 (described in greater detail below) away from the second gear block 87, to disengage detent projections 89a of the second coupling member 92 from associated ones of the second gear block detent receptacles 87c when a force maintaining the detent projections 89a in engagement with the detent receptacles 87c is released.

The gear set 78 may also include one or more pinion gears 86 rotatably coupled to gear carrier 72 between the first gear block 80 and the second gear block 87. Pinion gears 86 may be structured to rotatably mesh with the first and second bevel gears 80g, 87g of the first and second gear blocks 80, 87 during rotation of the steering levers 30a, 30b as described herein so that all of the pinion gears 86 are rotatably coupled to each of first and second bevel gears 80g, 87g. A first one of pinion gears 86 may be structured to support a torque transfer member 65 rotationally connected to the first one of pinion gears 86. One or more additional pinion gears 86 may be rotatably coupled to the gear carrier 72 at locations angularly spaced apart along the gear carrier from the first pinion gear, also to aid in maintaining spacing between the first and second gear blocks 80, 87.

Figure 8:
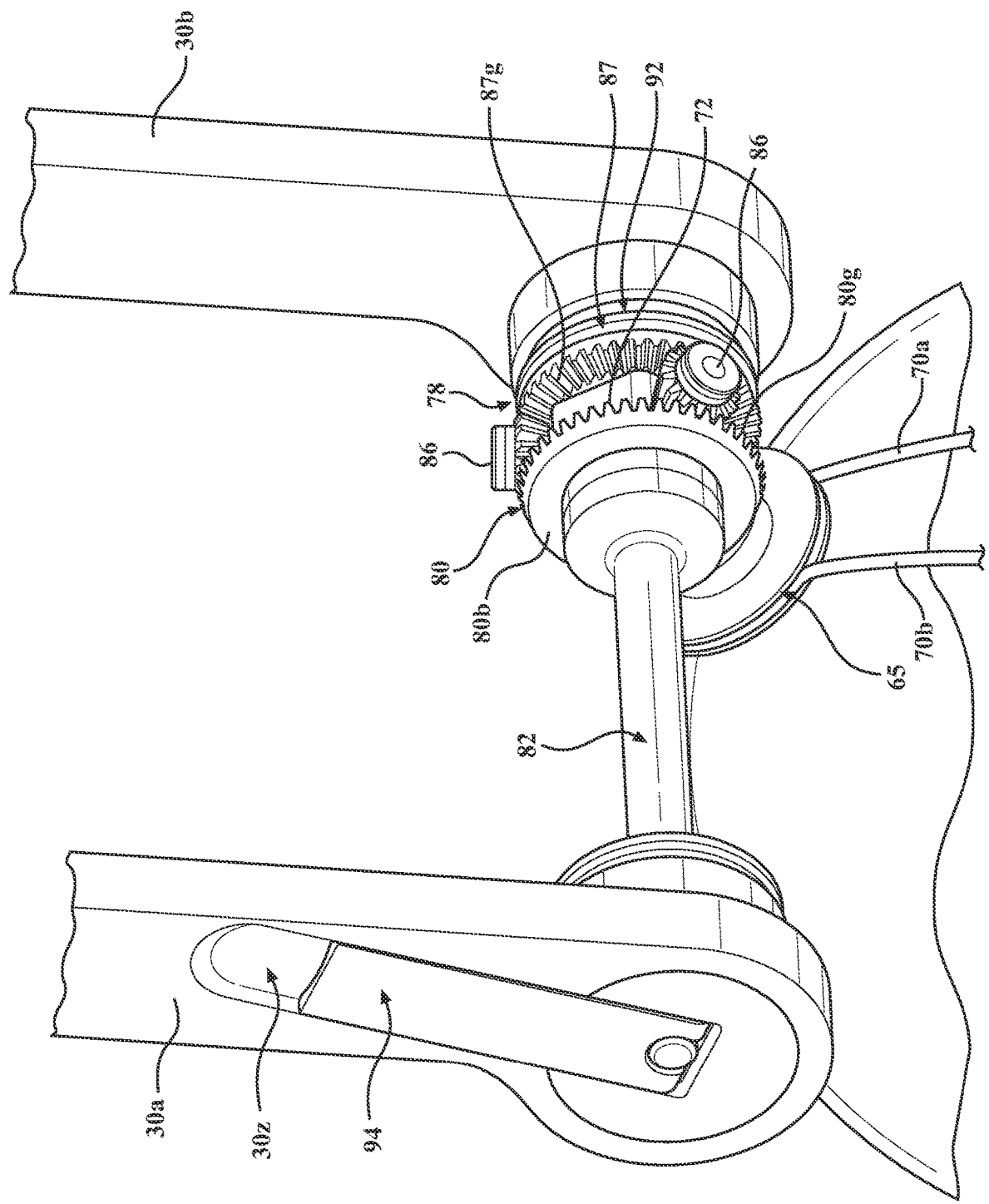
FIG. 8 is a schematic frontal perspective view of a portion of a mechanism mounted inside an interior cavity of a base of the luggage item, for steering the luggage item when the luggage item is in the riding mode, and for maintaining the steering levers in their stowed positions when the luggage item is in the transport mode.
Figure 9:
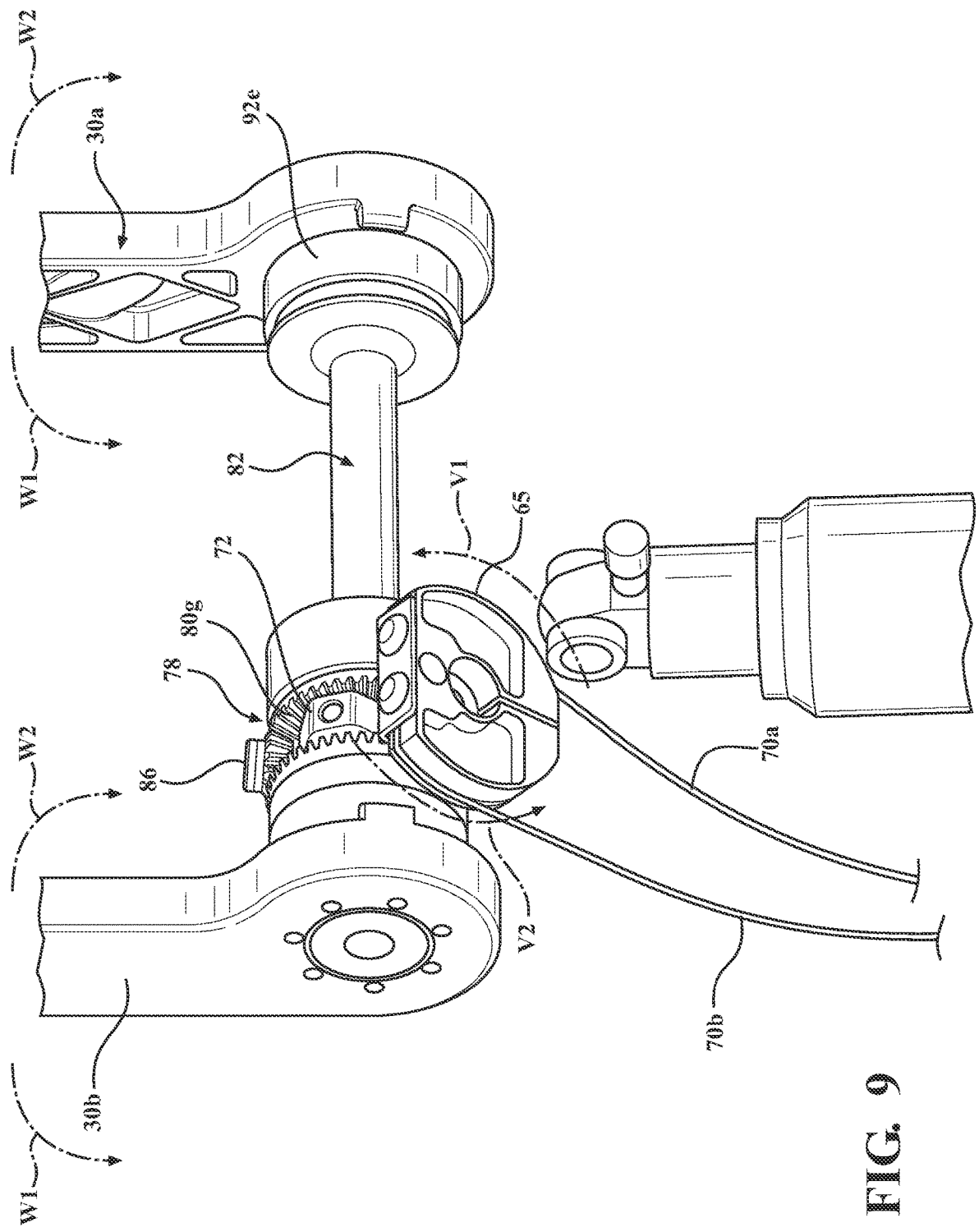
FIG. 9 is a schematic rear perspective view of the portion of the steering mechanism shown in FIG. 8.

Referring to FIGS. 8 and 9, torque transfer member 65 may be rotationally connected to a first one of pinion gears 86. In a manner described herein, ends of the first and second steering cables 70a, 70b may be attached to the torque transfer member 65 and opposite ends of the first and second steering cables 70a, 70b may be attached to the hub 40h of the steerable first wheel 40 (FIG. 7) so that rotation of the torque transfer member 65 in an associated first torque direction V1 causes the steerable wheel 40 to turn in a first direction S1, and rotation of the torque transfer member 65 in an associated second torque direction V2 opposite the first torque direction V1 causes the steerable wheel 40 to turn in a second direction S2.

Referring again to FIGS. 5 and 7, first and second steering cables 70a, 70b may extend downwardly through the base interior cavity 22j to enter the hinge pin sleeve 60s at open end 60s-1. First and second steering cables 70a, 70b may exit the hinge pin sleeve 60s at the opening 60s-4 to enter associated ones of the steering cable passages 63p, 63r formed in the mounting bracket 60. Referring to FIG. 7, first steering cable 70a may be operably connected to a first side T1 of the wheel hub 40h so as to enable application of a force to the first cable to turn the wheel about the kingpin axis 40x in a first direction S1. Second steering cable 70b may be operably connected to the second side T2 of the wheel hub 40h opposite the first side of the wheel hub, so as to enable application of a force to the second cable 70b to turn the wheel 40 about the kingpin axis in a second direction S2 opposite the first direction S1.

Referring to FIGS. 8-10B, a first coupling member 82 may have a passage 82p extending therethrough to accommodate a portion of the securement shaft 76. First coupling member 82 may have a first end 82b incorporating the previously-mentioned detent projections 82a for engaging the complementary detent receptacles 80c formed on the first gear block 80. a first end shoulder 82c may be provided adjacent the securement shaft passage 82p to provide a bearing surface for an end the first spring 85 extending from the first gear block spring-receiving cavity 80d. The first coupling member 82 may also have a second end 82d positioned opposite first end 82b. A portion of the first coupling member second end 82d may extend out of the base interior cavity 22j to an exterior of the base 22, where the second end 82d may be rotationally coupled to the first steering lever 30a. A first bushing 82e may be interposed between the first coupling member 82 and the base 22 where the first coupling member 82 exits the base 22 to rotatably support the first coupling member 82 with respect to the base 22.

The first coupling member 82 may be operably connected to the gear set 78 about securement shaft 76 (described in greater detail below) so as to enable movement of the first coupling member 82 along a longitudinal axis X1 of the securement shaft. The first coupling member second end 82d may have a cavity 82f with an interior shoulder 82g.

First steering lever 30a may be rotatably coupled to the base 22 adjacent the first face 22g (FIG. 2) of the base 22, so as to be movable between a deployed orientation (FIG. 2) and the stowed orientation (FIG. 1A) inside the first steering lever receptacle 22s. The first steering lever 30a may be rotationally connected to the first coupling member 82 proximate the first coupling member second end 82d. referring to FIGS. 1A and 8, first steering lever 30a may have a securement lever-receiving cavity 30z formed therealong and structured for receiving therein a securement lever 94 (described in greater detail below) when the securement lever 94 is rotated to its second orientation. The cavity 30z may be structured so that the securement lever 94 extends flush with an outer surface of the first steering lever 30a when the securement lever 94 is received in the cavity 30z, or such that the securement lever 94 is recessed with the cavity 30z below the outer surface.

Referring to FIGS. 10A and 10B, second coupling member 92 may have a passage 92a extending therethrough to accommodate a portion of the securement shaft 76. Second coupling member 92 may have a first end 92b incorporating the previously-mentioned detent projections 89a for engaging the complementary detent receptacles 87c formed on the second gear block 87. A second end shoulder 87e may be provided adjacent the securement shaft passage 92a to provide a bearing surface for an end the second spring 90 extending from the second gear block spring-receiving cavity 87d.

The second coupling member 92 may also have a second end 92d positioned opposite first end 92b. A portion of the second coupling member second end 92d may extend out of the base interior cavity 22j to an exterior of the base 22, where the second end 92d may be rotationally coupled to the second steering lever 30b. A second bushing 92e may be interposed between the second coupling member 92 and the base 22 where the second coupling member 92 exits the base 22 to rotatably support the second coupling member 92 with respect to the base 22. The second steering lever 30b may be rotationally connected to the second coupling member 92 proximate the second coupling member second end 92d.

Referring to FIGS. 10A and 10B, the second coupling member 92 may have a cavity 92k formed therein and a cavity opening at the second coupling member second end 92d. The cavity 92k may have a floor 92m therein for supporting a torque relief spring 100 thereon. The torque relief spring 100 may be any type of spring suitable for the purposes described herein. The torque relief spring 100 may have a first end bearing against floor 92m and a second end opposite the first end. the torque relief spring 100 may have spring constant that is much greater than the spring constants of first and second springs 85 and 90 previously described (i.e., the torque relief spring 100 may be much "stiffer" than the first and second springs 85 and 90). A cap 101 may be applied to the torque relief spring 100 to bear on the torque relief spring at its second end. The cap 101 may be attached to a second end 76b of the securement shaft 76 (described in greater detail below) so that a force acting in a direction F1 exerted on the cap by the securement shaft 76 is transmitted to the torque relief spring 100, to compress the torque relief spring. As seen in FIGS. 8, 10A, and 10B, the gear set 78 is mounted to the gear carrier 72 between the first coupling member 82 and the second coupling member 92.

Second steering lever 30b may be rotatably coupled to the base 22 adjacent the second face 22h of the base 22 so as to be movable between a deployed orientation (FIGS. 2 and 8) and a stowed orientation (FIGS. 1A and 1B) inside the second steering lever receptacle 22t. The second steering lever 30B may be rotationally connected to the second coupling member 92 proximate the second coupling member second end 92d.

The securement shaft 76 may have a first end 76a extending into the first coupling member second end cavity 82f and a second end 76b extending into the second coupling member second end spring-receiving cavity 92k. As seen in FIGS. 10A and 10B, securement shaft 76 may extend into the first coupling member second end cavity 82f through the first coupling member 82, the first gear block 80, the gear carrier 72, the second gear block 87, and the second coupling member 92 to where the securement shaft has cap 101 applied to the torque relief spring 100. The securement shaft 76 may be axially movable along a longitudinal axis X1 of the shaft responsive to rotation of the securement lever 94 as described below. The securement shaft 76 may also be rotatable about the axis X1. In combination, and as described herein, the securement lever 94, the securement shaft 76, and the torque relief spring 100 may enable transmission of forces along the axis X1 which bring the first coupling member detent projections 82a into detachable rotational connection engagement with the first gear block detent receptacles 80c, and the second coupling member detent projections 89a into detachable rotational connection with the second gear block detent receptacles 87c.

Securement lever 94 may be rotatably coupled to the securement shaft 76 at the securement shaft first end 76a, thereby forming a rotation axis X3 between the securement lever 94 and the securement shaft 76. The securement lever 94 may also be structured to abut the first coupling member interior shoulder 82g inside the first coupling member second end cavity 82f. The securement lever 94 may rotatable to (and securable in) any of a first orientation (FIG. 10B) and a second orientation (FIGS. 8, 10A).

referring to FIG. 10B, in the first orientation of the securement lever 94, a first surface 94b of the securement lever 94 bears against the interior shoulder 82g of the first coupling member 82. In addition, the torque relief spring 100 (secured along securement shaft 76 by cap 101) bears against floor 92m of second coupling member 92. By this arrangement, the securement lever 94 is operably connected to the first coupling member and to the second coupling member.

The securement lever 94 may be structured so that rotation of the lever in direction DD1 to the first orientation (with the lever first surface 94b bearing against the internal shoulder 82g) moves the securement shaft 76 in direction F2 (FIG. 10B). This movement enables a force exerted by the first spring 85 to urge the first coupling member 82 in direction F1 (opposite direction F2), away from the first gear block 80. This movement rotationally disengages the first coupling member detent projections 82a from the first gear block detent receptacles 80c, thereby rotationally disconnecting the first coupling member 82 from the first gear block 80. Since the first steering lever 30a is rotationally connected to the first coupling member 82, rotational disconnection of the first coupling member 82 from the first gear block 80 enables the first steering lever 30a to be rotated independently of the gear set 78.

Similarly, the rotation of the securement lever 94 to the first position enables a force exerted by the second spring 90 to urge the second coupling member 92 in direction F2, away from the second gear block 87. This movement rotationally disengages the second coupling member detent projections 89a from the second gear block detent receptacles 87c, thereby rotationally disconnecting the second coupling member 92 from the second gear block 87. Since the second steering lever 30b is rotationally connected to the second coupling member 92, rotational disconnection of the second coupling member 92 from the second gear block 87 enables the second steering lever 30b to be rotated independently of the gear set 78.

referring now to FIG. 10A, when the securement lever 94 is rotated in direction DD2 to the second orientation of the lever, a second surface 94a of the securement lever 94 bears against the interior shoulder 82g. This rotation operates to move the securement shaft 76 in direction F1. because the torque relief spring 100 has a spring constant that is much greater than the spring constants of first and second springs 85 and 90, movement of the securement shaft 76 in direction F1 causes the second coupling member 92 to move in direction F1 against the separating force exerted by the second spring 90, thereby engaging the second coupling member detent projections 89a with the second gear block detent receptacles 87c, with no appreciable axial deflection of the torque relief spring 100. This rotationally connects the second coupling member 92 and its rotationally connected second steering lever 30b to the second gear block 87 and gear set 78. Similarly, movement of the securement shaft 76 in direction F1 with securement lever 94 pushing against shoulder 82g causes the first coupling member 82 to move in direction F2 against the separating force exerted by the first spring 85, thereby engaging the first coupling member detent projections 82a with the first gear block detent receptacles 80c. This rotationally connects the first coupling member 82 and its rotationally connected first steering lever 30a to the first gear block 80 and gear set 78. Rotation of securement lever 94 in direction DD2 also stows the securement lever in first steering lever cavity 30z, thereby locking the securement lever 94 in the stowed orientation to maintain the first coupling member 82 in rotational connection with the first gear block 80 and the second coupling member 92 in rotational connection with the second gear block 87. Thus, rotation of the securement lever 94 to the first orientation enables rotational disconnection of the first coupling member 82 and the second coupling member 92 from the gear set 78. Also, rotation of the securement lever 94 to the second orientation urges the first coupling member 82 and the second coupling member 92 toward each other and into rotational connection with the gear set 78, thereby rotationally connecting the first steering lever 30a and the second steering lever 30b to the gear set 78.

Referring to FIGS. 1A-6, second wheel 42 may be rotatably coupled to the base 22 so as to be movable between a stowed position in the cavity first portion (shown in FIGS. 1A-1C) and a deployed position outside the cavity first portion (FIGS. 2, 3 and 4). In one or more arrangements, the second wheel 42 is rotatably coupled to the base 22 by rotatably coupling the wheel 42 to a second end of another mounting bracket 160 structured similarly to the mounting bracket 60 previously described, but omitting the steering cable passages. The other mounting bracket 160 may be rotatably coupled to the frame 22z. The second wheel 42 may include a tire 42a and a wheel hub 42h supporting the tire 42a. As seen in the drawings, wheel 42 may form a rear wheel of the wheeled luggage item 20. As seen in FIGS. 3 and 4, the wheel mounting bracket may 160 be rotatably coupled to the base 22 so as to support the second wheel 42 so that second wheel extends below the lowermost portion of the base 22 (in this case, the third edge 22c of the base) when the second wheel 42 is locked in a deployed position and in contact with the ground surface GS1.

Referring to FIG. 6, a known or later-developed direct drive or other in-wheel motor 42x may be operably connected to the second wheel 42 so as to drive a rotation of the second wheel 42 in a known manner during operation of the wheeled luggage item 20 in a transport mode. A battery 25 may also be mounted on the frame and operably connected to the motor 42x to supply power to the wheel 42 for propelling the wheeled luggage item 20 when it is in a riding mode.

In one or more arrangements, a planetary gearbox 42g may be used to transmit motion from the motor 42x to the driven, second wheel 42. For example, the motor 42x may be statically mounted on the wheel mounting bracket 160, and an output shaft of the motor 42x may be structured to meshingly engage two or more outer gears (not shown) rotatably coupled to a carrier which is rotationally connected to the wheel 42. Then, rotation of the motor output shaft causes rotation of the outer gears and the rotationally attached wheel 42. By this method, in a known manner, the second wheel 42 may be driven by the motor 42x.

The motor 42x may be operably connected (by a wired or wireless connection) to control module 213, which may transmit throttle control signals to the motor 42x to control a speed of the motor responsive to an angle of the twist grip 30h as detected by angle sensor 30s.

Referring to FIG. 1D, the luggage item 20 can include one or more processors 110. In one or more arrangements, the processor(s) 110 can be a main processor(s) of the luggage item 20. For instance, the processor(s) 110 can be an electronic control unit (ECU).

The luggage item 20 may include a memory 112. The memory 112 is a random-access memory (RAM), read-only memory (ROM), a hard-disk drive, a flash memory, or other suitable memory for storing the module(s). The memory 112 can include sensor data 119. In this context, "sensor data" means any information about the sensor(s) that the luggage item 20 is equipped with, including the capabilities and other information about such sensors. As an example, the sensor data 119 can include information about the twist grip angle sensor 30s described herein.

The memory 112 may store a control module 213 for controlling aspects of the luggage item 20 when the item is used in the driving mode. The luggage item 20 can include one or more such modules. The module(s) can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor (s) 110 is operably connected. The modules can include instructions (e.g., program logic) executable by one or more processor(s) 110. Alternatively, or in addition, one or more of data store(s) 115 or another portion of the luggage item 20 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Figure 11:
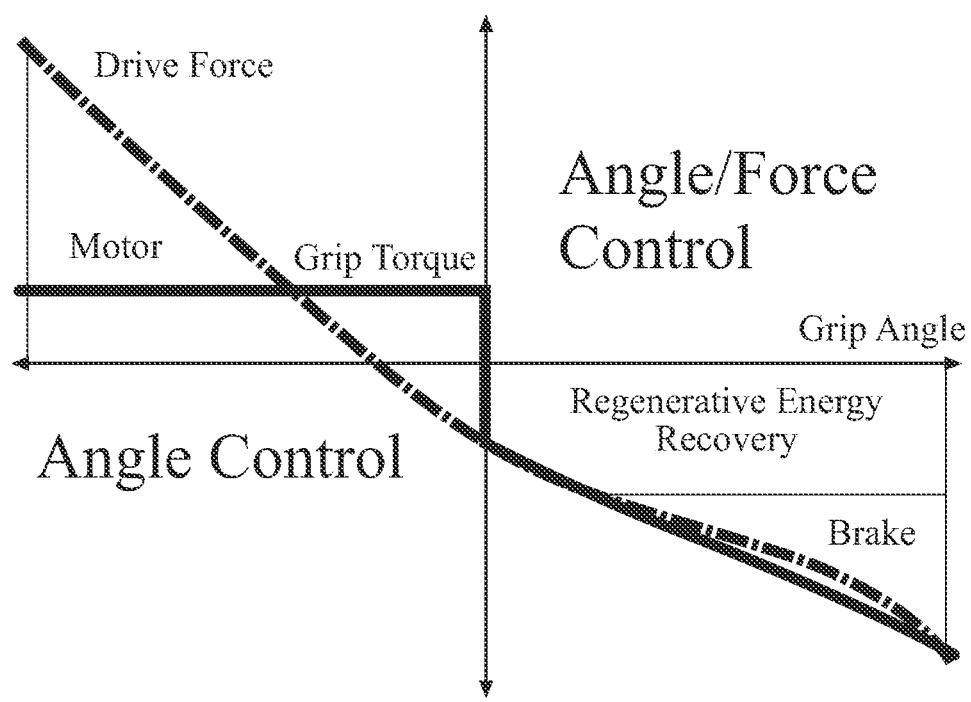
FIG. 11 is a plot showing twist grip angle vs. generated motive force when the twist grip is rotated in a first direction, and twist grip angle vs. generated braking force when the twist grip is rotated in a second direction opposite the first direction.

The control module 213 may include computer-readable instructions that when executed by the processor 110 cause the processor to control rear wheel motor 42x to increase a drive force generated by the motor in proportion to a rearward angle to which the twist grip 30h has been rotated as indicated by the angle sensor 30s. As seen in FIG. 11, the control module 213 may also be configured to power down the motor at slight rearward rotation angles of the twist grip 30h, to enable regenerative recovery of energy from forward momentum of the luggage item 20 as the luggage item slows down.

Referring to FIGS. 5A and 11, the control module may include computer-readable instructions that when executed by the processor 110 cause the processor to control servomotor 60m to start pressurizing the master cylinder 40c responsive to user rotation of the twist grip to a predetermined forward angle. Pressurization of the master cylinder 40c may cause the caliper 40n to contact the wheel hub, thereby slowing or braking the wheel 40. The control module 213 may also include computer-readable instructions that when executed by the processor 110 cause the processor to control the servomotor 40m to increase pressurization of the master cylinder 40c responsive to further rotation of the twist grip in direction R2. This may increase the pressure exerted by the caliper 40n on the wheel 40, thereby increasing the braking force on the wheel 40. The control module 213 may include computer-readable instructions that when executed by the processor 110 cause the processor to control the servomotor 40m to decrease pressurization of the master cylinder 40c responsive to rotation of the twist grip 30h in direction R1. This may decrease the pressure exerted on by the caliper on the wheel 40, thereby reducing the braking force. Also, the motor 42x may be structured to enable regenerative recovery of energy from forward momentum of the luggage item 20 while the caliper 40n is in frictional contact with the wheel 40 (i.e., while the brake 40b is engaged). This energy may be shunted to the battery 45 to help recharge the battery.

Operation of the throttle and braking mechanisms will now be described with reference to the drawings.

To control the throttle to propel the luggage item 20 forward, the twist grip 30h may be rotated rearwardly in direction R1 as shown in FIG. 2B. As shown in FIG. 11, the control module 213 may be configured to control operation of the motor 42x to increase a drive force generated by the motor in proportion to a rearward angle to which the twist grip 30h has been rotated.

As seen in FIG. 11, to slow and stop the luggage item 20, the twist grip may be rotated forward in direction R2. At slight rearward rotation angles of the twist grip 30h, the motor 42x may be powered down to enable regenerative recovery of energy from forward momentum of the luggage item 20 as the luggage item slows down. This energy may be shunted to the battery 45 to help recharge the battery. When the user rotates the twist grip 30h to a predetermined forward angle, the control module 213 may generate a signal to the servomotor 40m initiating active operation of the brake 40b. This causes the servomotor 40m to pressurize the cylinder 40c to frictionally engage the caliper 40n with the wheel 40.

Operation of the steering mechanism will now be described with reference to the drawings.

Referring to FIG. 1A, the wheeled luggage item 20 may initially be in the transport mode. In this mode, the wheeled luggage item 20 may be manually pulled along a ground surface like a conventional suitcase. The wheeled luggage item 20 may be manually converted from the transport mode to a riding mode. To convert the wheeled luggage item 20 into the riding mode, the first and second wheels 40, 42 may be unlocked from their respective stowed positions inside the base interior cavity second portion 22m, then rotated (in direction G1 for wheel 40 and G2 for wheel 42) from the stowed positions to their respective deployed positions. The wheels 40, 42 may then be locked in their respective deployed positions.

The securement lever 94 may be rotated in direction DD1 from its second (locked) orientation (shown in FIGS. 1A, 8, and 10A) to its first (unlocked) orientation (shown in FIG. 10B) to enable rotational disconnection of the first coupling member 82 from the first gear block 80 and rotational disconnection of the second coupling member 92 from the second gear block 87, as previously described. This enables the first and second steering levers 30a, 30b to be rotated independently of the gear set 78. The steering levers 30a. 30b may then be rotated to their respective raised or steering positions (as seen in FIGS. 2-4, for example) without rotating the first gear block 80 and second gear block 87.

The securement lever 94 may then be rotated in direction DD2, back to the second orientation as previously described, to secure the first coupling member detent projections 82a in engagement with the first gear block detent receptacles 80c, and to secure the second coupling member detent projections 89a in engagement with the second gear block detent receptacles 87c. This rotationally connects the steering levers 30a, 30b to the gear set 78, thereby enabling steering of the wheeled luggage item 20 when ridden by a user.

As previously described, when the securement lever 94 is in the second orientation, the first gear block 80 is rotationally connected to the first steering lever 30a and is also rotatably coupled to the pinion gear 86 to which the torque transfer member 65 is rotationally connected. Also, the second gear block 87 is rotationally connected to the second steering lever 30b and is also rotatably coupled to the pinion gear 86 to which the torque transfer member 65 is rotationally connected. Referring to FIGS. 7 and 9, simultaneous rotation of the first steering lever 30a in a first rotational direction W1 and of the second steering lever in a second rotational direction W2 opposite the first rotational direction may produce a rotation of the pinion gears 86 (including the pinion gear to which the torque transfer member 65 is rotationally connected) in an associated first torque direction V1. rotation of the pinion gear 86 (to which the torque transfer member 65 is rotationally connected) in direction V1 results in rotation of torque transfer member 65 in first torque direction V1. Rotation of the torque transfer member 65 in the first torque direction V1 pulls on the attached first steering cable 70a, which pulls on the hub first side T1 (FIG. 7) attached to the end of the first steering cable 70a, thereby rotating the wheel 40 about the kingpin axis and causing the wheel 40 to turn in direction S1 (FIG. 7). In the view shown in FIG. 9, the first rotational direction W1 of the steering lever is in a forward direction of the moving wheeled luggage item 20 and the second rotational direction W2 is in a rearward direction of the moving wheeled luggage item 20 in the riding mode. Thus, during powered forward movement of the luggage item 20, a user may steer the device in a direction toward a first side P9-a of the vertical plane P9 (i.e., toward a "left" side of the base 22 from the perspective of a user seated on the luggage item as shown in FIGS. 3 and 4) by simultaneously rotating the first steering lever 30a forwardly and the second steering lever 30b rearwardly.

Similarly, simultaneous rotation of the first steering lever 30a in the second rotational direction W2 and of the second steering lever 30b in the first rotational direction W1 may produce a rotation of the pinion gears 86 (including the pinion gear to which the torque transfer member 65 is rotationally connected) in an associated second torque direction V2 opposite the first torque direction V1. Rotation of the pinion gear 86 to which the torque transfer member 65 is rotationally connected results in rotation of torque transfer member 65 in first torque direction V2. rotation of the torque transfer member 65 in the second torque direction V2 pulls on the second steering cable 70b, which pulls on the hub second side T2 (FIG. 7), thereby rotating the wheel 40 about the kingpin axis and causing the wheel 40 to turn in direction S2 opposite direction S1. Thus, during powered forward movement of the wheeled luggage item 20, a user may steer the luggage item in a direction toward a second side P9-b of the vertical plane P9 (i.e., toward a "right" side of the base 22 from the perspective of a user seated on the luggage item as shown in FIGS. 3 and 4) by simultaneously rotating the first steering lever 30a rearwardly and the second steering lever 30b forwardly. When turning in this direction, a portion of the wheel 40 will also enter the wheel mounting bracket cavity 60f.

Returning to FIG. 10A, the torque relief spring 100 may be structured to exert a compressive force on the gear set 78 and the first coupling member 82 when the securement lever 94 is in the second orientation. For purposes of normal operation of the steering levers 30a, 30b, the torque relief spring force may be sufficient to maintain the first coupling member 82 in rotational connection with the first gear block 80 when a torque applied to the first steering lever is below a predetermined level.

Figure 10C:
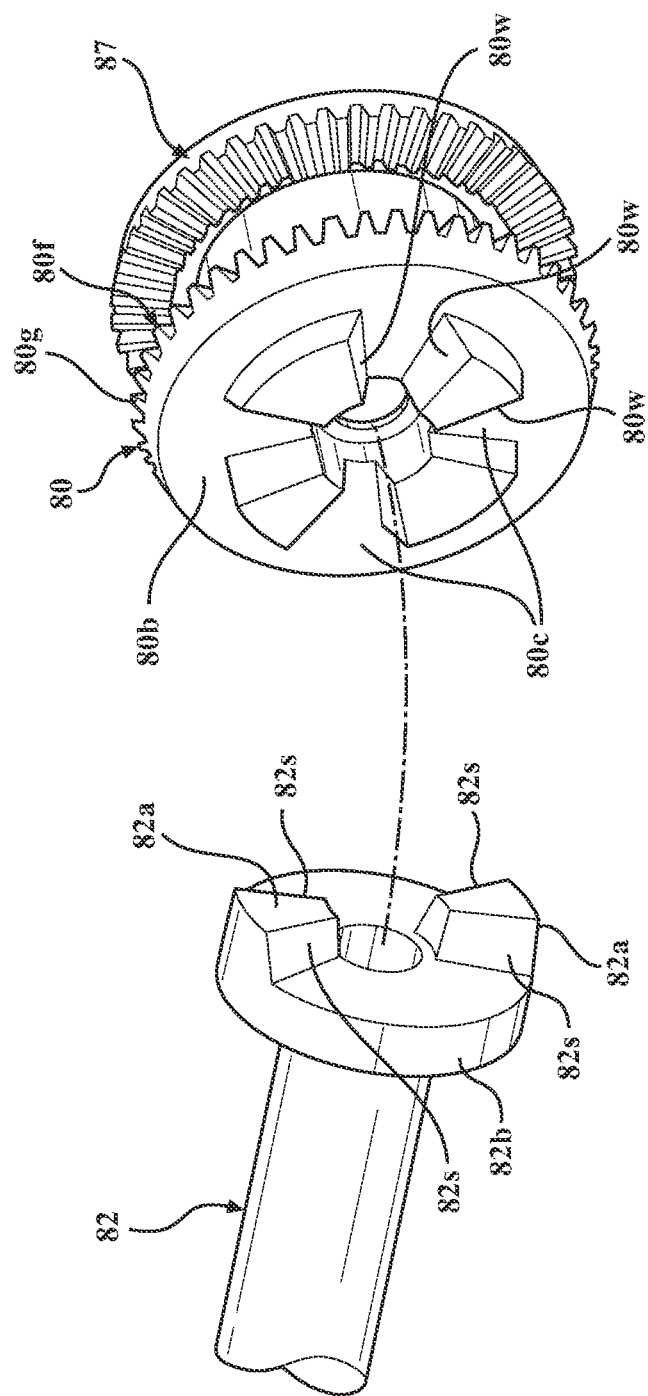
FIG. 10C is a schematic perspective view of a portion of the steering mechanism shown in FIGS. 10A and 10B, illustrating detachable rotational connection between detent projections of a steering mechanism coupling member and detent receptacles of a steering mechanism gear block.

Referring to FIG. 10C, the first coupling member 82 and the first gear block 80 may be structured to enable the first coupling member 82 to rotationally disconnect from the first gear block 80 against the force exerted by the torque relief spring, responsive to application of a torque at or above the predetermined level to the first steering lever 30a. To implement this effect, sides 82s of the first coupling member detent projections 82a and walls 80w forming sides of the first gear block detent receptacles 80c may be complementarily sloped or "ramped" so as to enable sliding of the detent projections 82a with respect to the receptacle walls 80w responsive to application of a torque at or above the predetermined level to the first steering lever 30a. This relative sliding movement may disengage the projections 82a from the receptacles 80c, thereby rotationally disconnecting the first coupling member 82 from the first gear block 80 against the compressive force exerted by the spring 100. Thus, for example, if excessive torque is applied by a rider to the first steering lever 30a in either of rotational directions W1 or W2, the applied torque may cause the detent projections 82*a* to slide along the sides 80*w* of the detent receptacles 80*c*, thereby tending to separate the first coupling member 82 from the first gear block 80. This allows the first coupling member 82 to "slip" with respect to the first gear block 80, thereby helping to prevent damage to the steering mechanism from excessing steering torque.

Similarly, the second coupling member 92 and the second gear block 87 may be structured to enable the second coupling member 92 to rotationally disconnect from the second gear block 87 against the force exerted by the torque relief spring, responsive to application of a torque at or above the predetermined level to the second steering lever 30*b*. To implement this effect, sides (not shown) of the second coupling member detent projections 89*a* and walls (not shown) forming sides of the second gear block detent receptacles 87*c* may be complementarily sloped or "ramped" so as to enable sliding of the detent projections 89*a* with respect to the detent receptacles 87*c* as described above, responsive to application of a torque at or above the predetermined level to the second steering lever 30*b*. This relative sliding movement may disengage the projections 89*a* from the receptacles 87*c*, thereby rotationally disconnecting the second coupling member 92 from the second gear block 87 against the compressive force exerted by the spring 100. Thus, for example, if excessive torque is applied by a rider to the second steering lever 30*b* in either of rotational directions W1 or W2, the applied torque may cause the detent projections 89*a* to slide along the walls of the detent receptacles 87*c*, thereby tending to separate the second coupling member 92 from the second gear block 87. This allows the second coupling member 92 to "slip" with respect to the second gear block 87, thereby helping to prevent damage to the steering mechanism from excessing steering torque. Thus, in the manner just described, the first coupling member 82 may be detachably rotatably connected to the first gear block 80 and the second coupling member 92 may be detachably rotatably connected to the second gear block 87.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A wheeled luggage item comprising:
   a base defining an interior cavity;
   a liner structured to partition the interior cavity into a first portion and a second portion physically isolated from the first portion;
   a wheel rotatably coupled to the base so as to be movable between a stowed position in the cavity second portion and a deployed position outside the cavity second portion; and
   a seat structure rotatable to any of a stowed orientation in which a seating surface of the seat structure is positioned at a first height above a ground surface, and a raised orientation in which another seating surface of the seat structure is positioned at a second height above the ground surface, the second height being greater than the first height.

2. The wheeled luggage item of claim 1, wherein the base includes a first edge, a first face extending along a first side of the first edge, and a second face extending opposite the first face along a second side of the first edge opposite the first side, and wherein the wheeled luggage item further comprises:
   a first steering lever receptacle extending between the first edge and the first face;
   a second steering lever receptacle formed between the first edge and the second face;
   a first steering lever rotatably coupled to the base so as to be movable between a deployed orientation and a stowed orientation inside the first steering lever receptacle; and
   a second steering lever rotatably coupled to the base so as to be movable between a deployed orientation and a stowed orientation inside the second steering lever receptacle.

3. The wheeled luggage item of claim 1, wherein the seat structure includes a first portion and a second portion extending from the first portion, the seat structure being rotatable relative to the base between the stowed orientation and the raised orientation so that the first portion forms the seating surface positioned at the first height above the ground surface when the seat structure is in the stowed orientation and the wheeled luggage item is in a riding configuration, and the second portion forms the seating surface positioned at the second height above the ground surface when seat structure is in the raised orientation and the wheeled luggage item is in the riding configuration.

4. The wheeled luggage item of claim 1, further comprising:
   another wheel rotatably coupled to the base so as to be movable between a stowed position in the cavity second portion and a deployed position outside the cavity second portion; and
   an in-wheel motor operably connected to the other wheel so as to drive a rotation of the other wheel during operation of the wheeled luggage item in a transport mode of the wheeled luggage item.

5. The wheeled luggage item of claim 4 further comprising a battery operably connected to the in-wheel motor so as to enable the battery to provide power to the in-wheel motor.

6. A wheeled luggage item comprising:
   a base;

a steerable wheel rotatably coupled to the base so as to be movable between a stowed position and a deployed position;
a first steering lever rotatably coupled to the base; and
a second steering lever rotatably coupled to the base,
the first steering lever and the second steering lever being operably connected to the wheel so as to enable steering of the wheel by simultaneous rotation of the first steering lever in one of a first rotational direction and a second rotational direction opposite the first rotational direction, and rotation of the second steering lever in the other one of the first rotational direction and the second rotational direction, when the wheel is in the deployed position.

7. The wheeled luggage item of claim 6, wherein:
the first steering lever is rotatably coupled to the base adjacent a first face of the base;
the second steering lever is rotatably coupled to the base adjacent a second face of the base opposite the first face; and
the first steering lever and the second steering lever are operably connected to the wheel so that the wheel is steerable in a first direction extending from a fore-aft plane of the base toward the first face by simultaneously rotating the first steering lever in a first rotational direction and the second steering lever in a second direction rotational opposite the first rotational direction, and so that the wheel is steerable in a second direction extending from the fore-aft plane of the base toward the second face by simultaneously rotating the first steering lever in the second rotational direction and the second steering lever in the first rotational direction.

8. The wheeled luggage item of claim 6, further comprising:
a gear set operably connected to the base; and
a torque transfer member operably connected to the gear set and to the steerable wheel so that rotation of the torque transfer member in a first torque direction causes the steerable wheel to turn in an associated first direction and so that rotation of the torque transfer member in a second torque direction causes the steerable wheel to turn in an associated second direction,
wherein the first steering lever and the second steering lever are operably connected to the gear set so that simultaneous rotation of the first steering lever in the first rotational direction and the second steering lever in the second rotational direction produces a rotation of the torque transfer member in the first torque direction, and wherein the first steering lever and the second steering lever are operably connected to the gear set so that simultaneous rotation of the first steering lever in the second rotational direction and the second steering lever in the first rotational direction produces a rotation of the torque transfer member in the second torque direction.

9. The wheeled luggage item of claim 8, wherein the gear set comprises:
a first bevel gear rotatably coupled to the base and structured to be rotationally connectible to the first steering lever;
a second bevel gear rotatably coupled to the base and structured to be rotationally connectible to the second steering lever; and
a pinion gear rotatably coupled to the base between the first bevel gear and the second bevel gear,
wherein the torque transfer member is rotationally connected to the pinion gear,
wherein the pinion gear is structured to meshingly engage with the first bevel gear and the second bevel gear so that simultaneous rotation of the first steering lever in the first rotational direction and rotation of the second steering lever in the second rotational direction cause rotation of the pinion gear and the torque transfer member in the first torque direction.

10. The wheeled luggage item of claim 6, further comprising a steering knuckle operably connected to the base, wherein a hub of the wheel is rotatably coupled to the steering knuckle by a kingpin so as to be rotatable about a kingpin axis of the kingpin, and wherein the wheeled luggage item further comprises:
a first steering cable operably connected to the first steering lever and to a first side of the wheel hub so as to enable application of a force to the first steering cable to turn the wheel about the kingpin axis in a first direction; and
a second steering cable operably connected to the second steering lever and to a second side of the wheel hub opposite the first side of the wheel hub so as to enable application of a force to the second steering cable to turn the wheel about the kingpin axis in a second direction opposite the first direction.

11. The wheeled luggage item of claim 10, wherein the steering knuckle is incorporated into a wheel mounting bracket rotatably coupled to the base, and wherein the first and second steering cables extend along the wheel mounting bracket to the wheel hub.

12. The wheeled luggage item of claim 11 wherein the wheel mounting bracket has a first end rotatably coupled to the base, a second end incorporating the steering knuckle, and a body portion extending between first and second ends, the body portion including:
an outwardly extending portion structured to extend from the mounting bracket second end in a direction away from a fore-aft plane of the base when the mounting bracket supports the wheel in the deployed position of the wheel; and
an inwardly extending portion structured to extend from an end of the outwardly extending portion in a direction toward the fore-aft plane of the base when the mounting bracket supports the wheel in the deployed position of the wheel,
the outwardly extending portion and the inwardly extending portion combining to define a cavity therebetween, the cavity being structured to receive a portion of the wheel therein as the wheel turns in the first direction.

13. The wheeled luggage item of claim 6, further comprising:
a first coupling member rotationally connected to the first steering lever;
a second coupling member rotationally connected to the second steering lever;
a gear set mounted to the base between the first coupling member and the second coupling member; and
a securement lever operably connected to the first coupling member and to the second coupling member
so that rotation of the securement lever to a first orientation enables rotational disconnection of the first coupling member and the second coupling member from the gear set, and so that rotation of the securement lever to a second orientation urges the first coupling member and the second coupling member into rotational connection with the gear set, thereby rotationally connecting the first steering lever and the second steering lever to the gear set.

14. The wheeled luggage item of claim 13, further comprising a securement shaft, wherein the securement lever is rotatably coupled to the securement shaft and in contact with the first coupling member,
  wherein the first coupling member, the gear set, and the second coupling member are positioned along the securement shaft,
  and wherein the first coupling member is movably mounted on the securement shaft so that rotation of the securement lever to the second orientation urges the first coupling member along the securement shaft toward the second coupling member, thereby bringing the first coupling member and the second coupling member into rotational connection with the gear set.

15. The wheeled luggage item of claim 13, further comprising:
  a first spring interposed between the first coupling member and the gear set; and
  a second spring interposed between the second coupling member and the gear set,
  wherein the wheeled luggage item is structured so that rotation of the securement lever to the first orientation enables the first spring to urge the first coupling member away from the gear set and out of rotational connection with the gear set, thereby rotationally disconnecting the first steering lever from the gear set, and
  wherein rotation of the securement lever to the first orientation also enables the second spring to urge the second coupling member away from the gear set and out of rotational connection with the gear set, thereby rotationally disconnecting the second steering lever from the gear set.

16. The wheeled luggage item of claim 13, wherein the first coupling member is structured to be detachably rotationally connected to the gear set when the securement lever is in the second orientation, wherein the wheeled luggage item further comprises a torque relief spring structured to exert a force on the gear set and the first coupling member when the securement lever is in the second orientation, the force being sufficient to maintain the first coupling member in rotational connection with the gear set when a torque applied to the first steering lever is below a predetermined level, and wherein the first coupling member and the gear set are structured to enable the first coupling member to rotationally disconnect from the gear set against the torque relief spring force, responsive to application of a torque at or above the predetermined level to the first steering lever.

17. The wheeled luggage item of claim 13, wherein the second coupling member is structured to be detachably rotationally connected to the gear set when the securement lever is in the second orientation, wherein the wheeled luggage item further comprises a torque relief spring structured to exert a force on the second coupling member and the gear set when the securement lever is in the first orientation, the force being sufficient to maintain the second coupling member in rotational connection with the gear set when a torque applied to the second steering lever is below a predetermined level,
  and wherein the second coupling member and the gear set are structured to enable the second coupling member to rotationally disconnect from the gear set against the torque relief spring force, responsive to application of a torque at or above the predetermined level to the second steering lever.

18. A wheeled luggage item comprising:
  a base defining an interior cavity;
  a steerable wheel rotatably coupled to the base so as to be movable between a stowed position and a deployed position;
  a first steering lever rotatably coupled to the base;
  a second steering lever rotatably coupled to the base
  a gear set operably connected to the first steering lever and the second steering lever;
  a torque transfer member operably connected to the gear set so that simultaneous rotation of the first steering lever in one of a first rotational direction and a second rotational direction opposite the first rotational direction, and of the second steering lever in the other one of the first rotational direction and the second rotational direction, causes rotation of the torque transfer member in an associated torque direction; and
  a first steering cable and a second steering cable operably connected to the torque transfer member and to the wheel, so that rotation of the torque transfer member in the associated torque direction causes the wheel to turn in an associated direction when the wheel is in the deployed position.

19. The wheeled luggage item of claim 18, wherein the interior cavity is partitioned into a first portion and a second portion opposite and physically isolated from the first portion, and wherein the wheeled luggage item further comprises:
  another wheel rotatably coupled to the base so as to be movable between a stowed position in the cavity second portion and a deployed position outside the cavity second portion; and
  an in-wheel motor operably connected to the other wheel so as to drive a rotation of the other wheel during operation of the wheeled luggage item in a transport mode of the wheeled luggage item.

20. The wheeled luggage item of claim 18, wherein the gear set comprises:
  a first bevel gear rotatably coupled to the base and structured to be rotationally connectible to the first steering lever;
  a second bevel gear rotatably coupled to the base and structured to be rotationally connectible to the second steering lever; and
  a pinion gear rotatably coupled to the base between the first bevel gear and the second bevel gear,
  wherein the torque transfer member is rotationally connected to the pinion gear,
  wherein the pinion gear is structured to meshingly engage with the first bevel gear and the second bevel gear so that rotation of the steering lever in the one of the first rotational direction and the second rotational direction and rotation of the second steering lever in the other one of the first rotational direction and the second rotational direction cause rotation of the pinion gear and the torque transfer member in the associated torque direction.

* * * * *